United States Patent [19]
Ichinohe et al.

[11] Patent Number: 5,485,531
[45] Date of Patent: Jan. 16, 1996

[54] CHARACTER-FEATURE EXTRACTION DEVICE

[75] Inventors: Hitoshi Ichinohe; Yasuo Hongo; Masatoshi Okada, all of Tokyo, Japan

[73] Assignees: Fuji Electric Co., Ltd., Kawasaki; Fuji Facom Corporation, Hino, both of Japan

[21] Appl. No.: 123,750

[22] Filed: Sep. 17, 1993

Related U.S. Application Data

[63] Continuation-in-part of Ser. No. 97,866, Jul. 22, 1993, which is a continuation of Ser. No. 285,840, Dec. 19, 1988, abandoned.

[30] Foreign Application Priority Data

Dec. 17, 1987 [JP] Japan .................................. 62-317343
Jul. 27, 1988 [JP] Japan .................................. 63-185497
Sep. 17, 1992 [JP] Japan .................................. 4-273785

[51] Int. Cl.$^6$ .................................................. G06K 9/48
[52] U.S. Cl. ........................................ 382/198; 382/305
[58] Field of Search ............................ 382/21, 22, 198, 382/199, 200, 305

[56] References Cited

U.S. PATENT DOCUMENTS

| | | | |
|---|---|---|---|
| 3,987,412 | 10/1976 | Morrin, II ................................. | 382/21 |
| 4,020,462 | 4/1977 | Morrin, II ................................. | 382/21 |
| 4,628,532 | 12/1986 | Stone et al. ............................... | 382/21 |
| 4,630,306 | 12/1986 | West et al. ................................ | 382/21 |

Primary Examiner—Jose L. Couso
Assistant Examiner—Chris Kelley
Attorney, Agent, or Firm—Brumbaugh, Graves, Donohue & Raymond

[57] ABSTRACT

A feature recognition method and apparatus is described where in one embodiment the digitized two-dimensional pattern or image usually of a character to be recognized is subjected first to conversion into a vector. The vector subsequently undergoes propagation and stopping operations subject to various tests so as to generate a list of unique features about the pattern being identified. Thusly, identified features are compared mathematically to a previously created feature library until a match is found. In an alternative embodiment, to increase the speed of three-dimensional, feature-extraction processing of character patterns the vector-extraction positions on a pattern are converted into flags and accommodated in a corresponding motion-flag memory. Flag values in the motion-flag memory and a stopping-flag memory are read sequentially after propagation processing, and it is determined whether there are flag values representing the existence of vectors in the flag values in the above addresses of other flag memories and addresses adjoining thereto. The flag values in corresponding addresses in a self-moving flag memory are reset, and at the same time, the flags are set in corresponding addresses in the stopping-flag memory relative to vectors with the same direction, if there are vector flag values in the corresponding addresses. The flag values in each stopping-flag memory and each motion-flag memory are converted into vector values via determination processing after propagation processing, and are output as three-dimensional features.

3 Claims, 19 Drawing Sheets

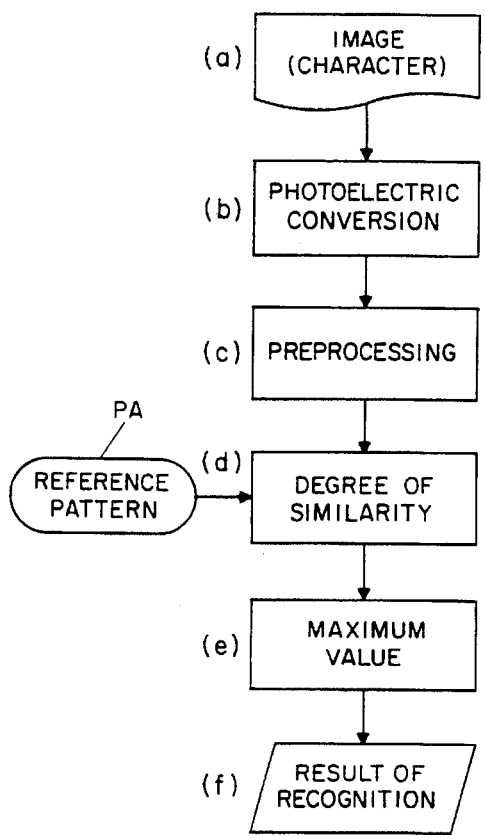
FIG. 1
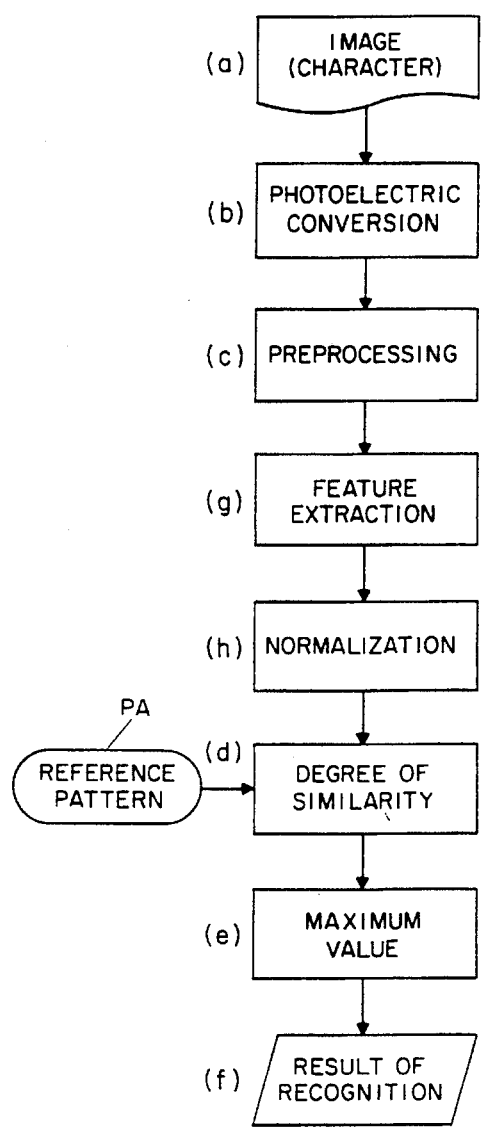
FIG. 2
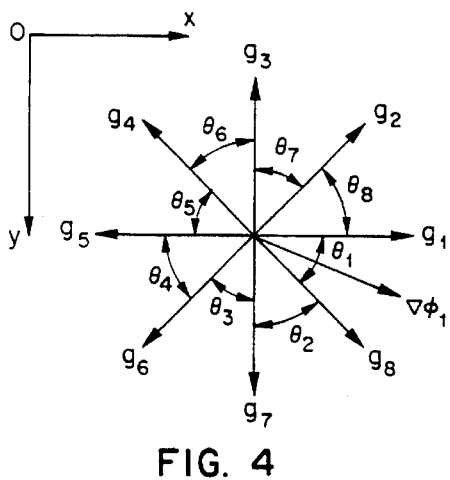
FIG. 4
| MA$_X$ | | |
|---|---|---|
| -1 | 0 | 1 |
| -1 | 0 | 1 |
| -1 | 0 | 1 |
FIG. 5a
| MA$_Y$ | | |
|---|---|---|
| -1 | -1 | -1 |
| 0 | 0 | 0 |
| 1 | 1 | 1 |
FIG. 5b

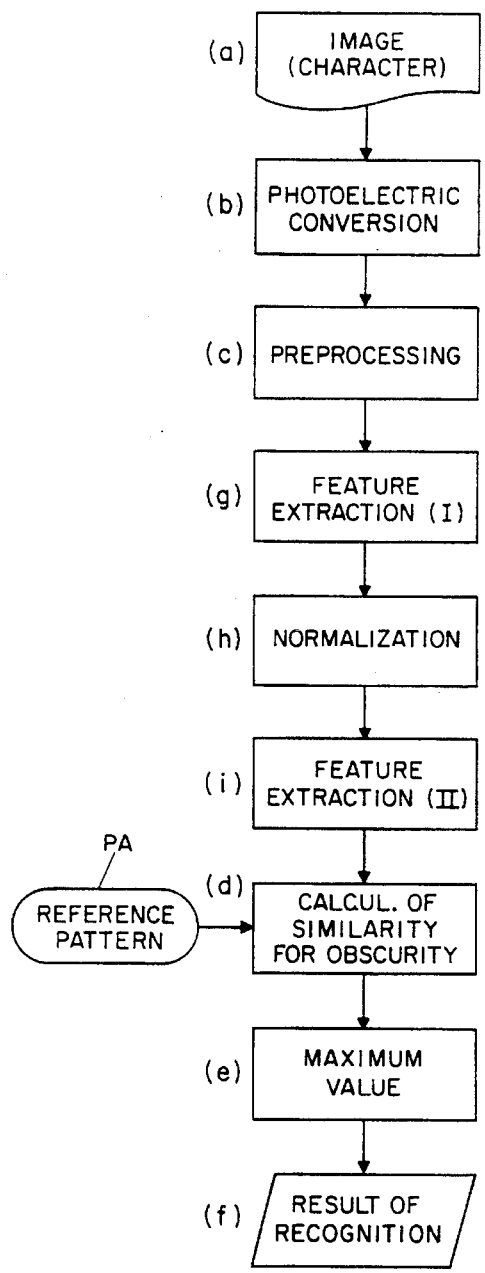
FIG. 3
| MB₁ | | | | | | |
|---|---|---|---|---|---|---|
| 4 | 3 | 3 | 3 | 3 | 3 | 2 |
| 5 | 4 | 3 | 3 | 3 | 2 | 1 |
| 5 | 5 | 4 | 3 | 2 | 1 | 1 |
| 5 | 5 | 5 | 0 | 1 | 1 | 1 |
| 5 | 5 | 6 | 7 | 8 | 1 | 1 |
| 5 | 6 | 7 | 7 | 7 | 8 | 1 |
| 6 | 7 | 7 | 7 | 7 | 7 | 8 |
FIG. 6a
| MB₂ | | | | | | |
|---|---|---|---|---|---|---|
| 3 | 1 | 2 | 3 | 2 | 1 | 3 |
| 1 | 2 | 1 | 2 | 1 | 2 | 1 |
| 2 | 1 | 1 | 1 | 1 | 1 | 2 |
| 3 | 2 | 1 | 0 | 1 | 2 | 3 |
| 2 | 1 | 1 | 1 | 1 | 1 | 2 |
| 1 | 2 | 1 | 2 | 1 | 2 | 1 |
| 3 | 2 | 1 | 3 | 2 | 1 | 3 |
FIG. 6b
| MB₃ | | | | | | |
|---|---|---|---|---|---|---|
| 0 | 4 | 4 | 0 | 2 | 2 | 0 |
| 4 | 0 | 4 | 0 | 2 | 0 | 2 |
| 4 | 4 | 0 | 0 | 0 | 2 | 2 |
| 0 | 0 | 0 | 0 | 0 | 0 | 0 |
| 6 | 6 | 0 | 0 | 0 | 8 | 8 |
| 6 | 0 | 6 | 0 | 8 | 0 | 8 |
| 0 | 6 | 6 | 0 | 8 | 8 | 0 |
FIG. 6c
| MB₄ | | | | | | |
|---|---|---|---|---|---|---|
| 0 | 2 | 1 | 0 | 1 | 2 | 0 |
| 2 | 0 | 1 | 0 | 1 | 0 | 2 |
| 1 | 1 | 0 | 0 | 0 | 1 | 1 |
| 0 | 0 | 0 | 0 | 0 | 0 | 0 |
| 1 | 1 | 0 | 0 | 0 | 1 | 1 |
| 2 | 0 | 1 | 0 | 1 | 0 | 2 |
| 0 | 2 | 1 | 0 | 1 | 2 | 0 |
FIG. 6d
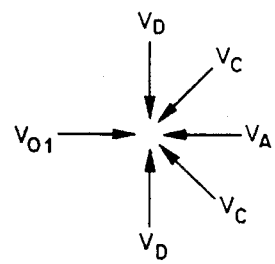
FIG. 7a
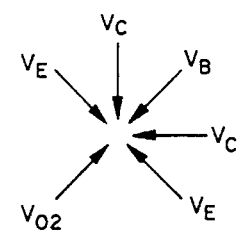
FIG. 7b

| VECTOR COMPONENT OF INTEREST | | | | | | | | | | | | | |
|---|---|---|---|---|---|---|---|---|---|---|---|---|---|
| UNIT VECTOR NUMBER | | | 1 | 2 | 3 | 4 | 5 | 6 | | 7 | 8 | | |
| UNIT VECTOR DIRECTION | | | ← | ↙ | ↓ | ↘ | → | ↗ | | ↑ | ↖ | | |
| APPARENT PLANE NUMBER | | | 1 | 2 | 3 | 4 | 5 | 6 | 7 | 8 | 9 | 10 | 11 | 12 |
| PROPAGATION DIRECTION | | | ← | ↓ | ← | ↓ | → | ↓ | → | ↑ | → | ↑ | ← | ↑ |
| OPPOSITE VECTOR COMPONENT | 1 | ← | 1 | ← | | | | D | C | C | A | C | C | D | | |
| | 2 | ↙ | 2 | ↓ | | | | E | E | C | B | B | C | E | E |
| | | | 3 | ← | | | | E | E | C | B | B | C | E | E |
| | 3 | ↓ | 4 | ↓ | D | | | | | D | C | C | A | C | C |
| | 4 | ↘ | 5 | → | C | E | E | | | | E | E | C | B | B |
| | | | 6 | ↓ | C | E | E | | | | E | E | C | B | B |
| | 5 | → | 7 | → | A | C | C | D | | | | D | C | C |
| | 6 | ↗ | 8 | ↑ | C | B | B | C | E | E | | | | E | E |
| | | | 9 | → | C | B | B | C | E | E | | | | E | E |
| | 7 | ↑ | 10 | ↑ | D | C | C | A | C | C | D | | | | |
| | 8 | ↖ | 11 | ← | E | E | C | B | B | C | E | E | | | |
| | | | 12 | ↑ | E | E | C | B | B | C | E | E | | | |

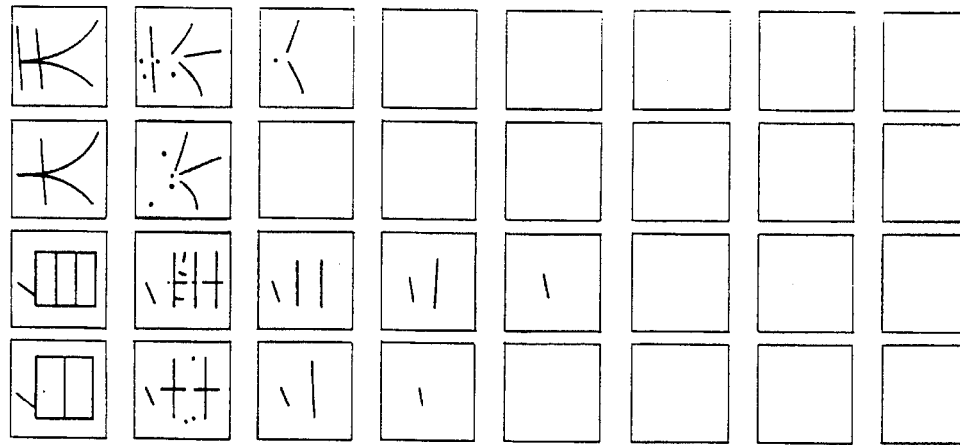

CHARACTER-FEATURE EXTRACTION DEVICE

SPECIFICATION

This is a continuation-in-part application of application Ser. No. 08/097,866, filed Jul. 22, 1993 as a continuation application of application Ser. No. 07/285,840, filed Dec. 19, 1988, now abandoned.

BACKGROUND OF THE INVENTION

The present invention relates to a method of recognizing a pattern in the form of a two-dimensional image and, more particularly, to a method of recognizing a pattern which is expressed as a two-dimensional figure given by lines such as a character or symbol. Further, the present invention relates to a character-feature extraction device that can perform high-speed processing even when the character features are extracted three-dimensionally.

PRIOR ART TECHNIQUES

Means for recognizing patterns in the form of two-dimensional figures are classified into two major categories: structural analysis technique and superposition technique (see the Journal of the Institute of Electronics and Communication Engineers of Japan, Vol. 61, No. 2, February 1978, pp. 115–124).

Pattern recognition utilizing structural analysis is applied in presently commercially available optical character readers which are chiefly used to read handwritten characters such as handwritten digits. This technique has the advantage that it can be applied to subjects whose shapes change relatively greatly, such as handwritten characters. However, this technique needs an exorbitant amount of design and experimental work, depending on various properties of characters to be recognized, i.e., the total number of categories differs on whether the patterns to be read are digits or characters, and on the degree of variation of shape intrinsic in handwritten characters.

Conversely, techniques using superposition require theoretically simple operations to recognize patterns. These techniques allow the meaning of each individual physical and intuitive processing step to be distinctly grasped. Further, they can be, in principle, used in a wide range of applications independent of the nature of the characters to be recognized. The similarity technique is one of the simplest approaches utilizing superposition and is illustrated in FIG. 1. When printed characters of a simple style are recognized by this similarity technique, various characters ranging from digits to Kanji characters can be treated in the same operation (see the Transactions of the Institute of Electronics and Communication Engineers of Japan, D, Vol. J56-D, No. 3, October 1973, p. 545–552). However, the similarity technique cannot be used unmodified to read handwritten characters.

To read handwritten characters, some recognition techniques have been developed which still depend on superposition and can be used to recognize greatly differing patterns, such as handwritten characters, while preserving the superposition and the intuitiveness intrinsic in the similarity technique. Especially, various improved method placing emphasis on feature extraction (g) of FIG. 2 have been proposed, for example ("Line Element Matching Method" in the Transactions of the Institute of Electronics and Communication Engineers of Japan, D, Vol. J62-D, No. 3, March 1979, pp. 217–224; "Cellular Features", the Transactions of the Institute of Communication Engineers of Japan, D, Vol. J66-D, No. 1, March 1979, pp. 17–24).

In the above examples, two-dimensional figures consisting of lines, such as characters, are recognized. Here, the local "direction" of each stroke constituting a figure is extracted. This "direction" is regarded as a vector, or feature, at the corresponding position in the original figure. The direction of the stroke can be derived by spatially differentiating a two-variable scalar function which is obtained by optically digitizing a two-dimensional figure. Thus derived, the "direction" may be referred to as a primary feature. This primary feature is derived from the two-variable scalar function by a relatively simple operation, in the form of a two-variable vector function corresponding to the two-dimensional figure.

It has been found that either the superposition technique or the correlation technique using the two-variable vector function expressing the primary feature is effective in recognizing patterns such as characters by superposition of two-variable scalar functions directly derived from patterns observed as described above. However, when handwritten characters need be recognized, more powerful identification methods are desired, and various proposals have been made. These proposals are classified into three major categories discussed below.

I. The First Method

In a first method, a two-variable vector function whose vector components are the directions of strokes constituting the figure, or primary features, is subjected to some regular and spatial arithmetic operations to extract more meaningful features.

One example of this method is disclosed in Japanese Patent Laid-Open No. 792/1984. This proposed method produced excellent experimental results, and was published in an article entitled "An Improved Correlation Method for Character Recognition", in the Transactions of the Institute of Electronics and Communication Engineers of Japan, D, J67-D, 2, February 1984, pp. 224–231, and J67-D, 12 December 1984, pp. 1442–1449. For a better understanding of the subject invention, this proposed method is next described briefly by referring to the flowchart of FIG. 3.

After a character to be recognized has been designated, the character is converted into an electric signal by an image scanner using single-dimensional line sensors (steps (1) and (b)). The resulting digitized information (data) about the image is stored in a memory. The data is preprocessed by a computer or other computing means to perform alignment, transformation into vectors, etc. (step (c)). Then feature extraction, normalization, and feature extraction are performed to extract high-order features (steps (g), (h), and (i)). The degree of similarity with a certain dictionary pattern is calculated, and the maximum value of the similarity is computed (steps (d), (e)). This value is delivered as the outcome of the recognition (step (f)).

The above procedure is described with somewhat greater detail by referring to FIGS. 4–8. FIG. 4 is a diagram illustrating unit vectors representing directions. FIGS. 5a and 5b show spatially differentiating masks. FIGS. 6a–6d are diagrams illustrating coupling coefficient masks. FIGS. 7a and 7b are conceptual representations of propagation and stopping operations. FIG. 8 is a diagram illustrating conditions in which propagation and stopping operations are performed.

First, an image is digitized into elements each of which represents either white or black. Then, the image is spatially quantized on a matrix of a given size. The boundary between the black portion (stroke component) of a character in each matrix element and white background is extracted. The boundary is expressed in terms of a linear combination of unit vectors $g_1$–$g_8$ defined so as to be spaced 45° from each other as shown in FIG. 4. The linear combination is so chosen hat the sum of squares of the coefficients takes its minimum value. To make it easy to obtain linear combination coefficients expressing this boundary component, spatially differentiating masks MAx and MAy shown in FIGS. 5a and 5b and coupling coefficient masks $MB_1$, $MB_2$, $MB_3$, $MB_4$ shown in FIG. 6a–6d are employed. In particular, spatially differentiated values about boundaries are represented as combinations of x-direction components and y-direction components (vx, vy), using the spatially differentiating masks MAx, MAy. Nonzero unit vector numbers and their coefficients are obtained, by the use of the coupling coefficient masks $MB_1$–$MB_2$.

Thus, a coupling coefficient P is given by P (i, j, k), where i is the X coordinate, j is the Y coordinate, and k is a unit vector. We now assume that the coefficient is a vector plane $P_k$ (i,j), where k is a parameter. That is, $$P_k(i,j) = P(i,j,k) \tag{1}$$

The size of $P_k(i,j)$ is normalized. Then, a pattern $Q_k(i,j)$ for each individual direction is caused to propagate, in a given direction. Subsequently, a stopping operation is carried out. This operation is repeated a given number of times. In the propagation operation, the pattern is moved a unit distance in the direction of the vector component. Orthogonal components are literal. Each oblique component is resolved into horizontal and vertical components and caused to propagate, since lattice points on orthogonal coordinates are used. Originally, 8 directional components existed. For the sake of arithmetic operations for stopping and propagation operations, 12 planes exist during the intermediate process as indicated in Table 1.

into horizontal and vertical components and caused to propagate.

The stopping operation is now described. A component which is stopped is no longer allowed to propagate. A first condition for a stopping operation holds when a pair of directly opposite vector components exists at the same coordinate. A second condition holds when these two vector components existing at neighboring coordinates face each other in the same direction of propagation. More specifically, since space is quantized, the two vector components cannot exist at the same coordinate because of odd-even relation between coordinate values. In this case, if the propagation operation were performed once more, then they would pass by each other. For this reason, they are stopped in close proximity to each other. A third condition holds when a pair of vector components which form an angle exceeding 90° to each other is located at the same coordinate. It is to be noted that the angle is formed before an oblique component is conveniently resolved into horizontal and vertical components. This can be intuitively seen from FIGS. 7a and 7b, where $V_{o1}$, $V_{o2}$ are vector components of interest and $V_A$–$V_E$ are opposite vectors satisfying any one of the stopping conditions. These opposite vectors can be either stopped components or propagating components. Fourthly, these stopping conditions hold between a vector component already stopped and a component that is now propagating, and these components are stopped. These stopping conditions are summarized in FIG. 8, where stopping operations are effected only between vector components indicated by symbols A–E.

FIG. 8 includes a row and a column of arrows pointing in unit-vector directions for unit vectors numbered 1 to 8, for vector components respectively designated as a vector component of interest and an opposite vector component. In FIG. 8, the symbol A is used where two picture elements meet with directly opposite, horizontal or vertical vector components; the symbol B is used where two picture elements meet with directly opposite, oblique vector components; the symbol C is used where a picture element with an oblique vector component obliquely meets a picture element with a hori-

TABLE 1

| | Direction of Propagation of Vector Component | | | | | | | | | | | |
|---|---|---|---|---|---|---|---|---|---|---|---|---|
| unit vector number | 1 | | 2 | | 3 | | 4 | | 5 | 6 | 7 | 8 |
| unit vector direction | ← | | ↙ | | ↓ | | ↘ | | → | ↗ | ↑ | ↖ |
| apparent plane number | 1 | 2 | 3 | 4 | 5 | 6 | 7 | 8 | 9 | 10 | 11 | 12 |
| propagation direction | ← | ↓ | ← | ↓ | → | ↓ | → | ↑ | → | ↑ | ← | ↑ |
| $\lambda_k$ | −1 | 0 | −1 | 0 | 1 | 0 | 1 | 0 | 1 | 0 | −1 | 0 |
| $\mu_k$ | 0 | 1 | 0 | 1 | 0 | 1 | 0 | −1 | 0 | −1 | 0 | −1 |

We express the result of the n-th propagation operation as $Q_k^{(n)}(i,j)$. The algorithm is given by $$Q_k^{(n)}(i+\lambda_k, j+\mu_k) = Q_k^{(n-1)}(i,j) \tag{2}$$

Note that $Q_k^{(o)}(i,j) = Q_k(i,j)$. In the above equation, $\lambda_k$ and $\mu_k$ show the directions of increment over the unit distance in the vector planes. As a variation of the propagation operation, orthogonal components and oblique components can be arbitrarily weighted. It is possible to leave only horizontal and vertical components by making the weight attached to oblique components equal to zero. In the weighting operation, one must note that each oblique component is resolved zontal or a vertical vector component; the symbol D is used where a picture element with a horizontal vector component meets a picture element with a vertical vector component; and the symbol E is used where two piecture elements with oblique vector components meet perpendicularly. In the actual procedure performed by a computer, whenever a stopping operation is carried out, stopped components are stored in different memory locations $L_x(i,j)$.

Next, arithmetic operations are performed to handle obscurity. For this purpose, the convolution of the well-known Gaussian filter function B(r,s) and function $L_k^{(N)}(i,j)$, where k is a parameter indicating the k-th component, and i, j are parameters indicating coordinates, is taken. The function $L_k^{(N)}(i,j)$ indicates each component of the two-dimensional feature pattern obtained by these stopping and propagation operations. Thus, we get $$G_k(i,j) = \Sigma_r \Sigma_s B(r,s) \cdot L_k^{(N)}(i,j) \tag{3}$$

The operation performed to handle obscurity reduces high-frequency components of the two-dimensional function $L_k^{(N)}(i,j)$ in the spatial frequency domain. The Gaussian filter function can be replaced by other similar function working similarly.

The operation for calculating the degree of similarity consists of computing the normalized correlation value between data matrix G(i, j, k) and reference pattern data prepared by a separate means. The data G is obtained by extracting features from an unknown figure to be recognized. Let the $F^{(l)}(i, j, k)$ matrix be the reference pattern. The degree of similarity $S_G^{(l)}$ are given by $$S_G^{(l)} = \frac{(F^{(l)}, G)}{\|F^{(l)}\| \cdot \|G\|} \tag{4}$$

$$\text{where } (F^{(l)}, G) = \Sigma_i \Sigma_j \Sigma_k G_k(i,j) \cdot F_k^{(l)}(i,j) \tag{5}$$

$$= \Sigma_i \Sigma_j \Sigma_k G_k(i,j,k) \cdot F^{(l)}(i,j,k)$$

$$\|F^{(l)}\| = \sqrt{(F^{(l)}, F^{(l)})} \tag{6}$$

$$\|G\| = \sqrt{(G, G)} \tag{7}$$

As an alternative, the degree of similarity may also be calculated in the manner described below by adding weights to the vector planes.

$$(F^{(l)}, G) = \Sigma_k W_k \cdot \{\Sigma_i \Sigma_j G_k(i,j) \cdot F_k^{(l)}(i,j)\} \tag{8}$$

$$= \Sigma_k W_k \cdot \{\Sigma_i \Sigma_j G(i,j,k) \cdot F^{(l)}(i,j,k)\}$$

The maximum $S_G^{(M)}$ of the degree if similarity ($S_G^{(l)}, \ldots, S_G^{(l)}, \ldots, S_G^{(L)}$) is given by $$S_G^{(M)} = MAX(S_G^{(l)}, \ldots, S_G^{(l)}, \ldots, S_G^{(L)}) \tag{9}$$

It is recognized that an unknown figure G belongs to a category M. If the relation $S_G^{(M)} \leq S_{GL}$ (preset value) holds, it follows that the unknown pattern differs from the dictionary pattern and so the unknown pattern is rejected. This concept is illustrated in Japanese Patent Laid Open No. 792/1984.

FIG. 9 shows examples of components of stroke features. FIG. 10 shows examples of components of background features. The flowchart of FIG. 3 differs from flowchart of FIG. 2 in that it has feature extraction (II) (step (f)). This example of complementary feature field shown in FIGS. 9 and 10 includes feature extraction (II) (step (f)) in which local directions of boundaries between strokes of the observed figure (1) shown in FIGS. 9 and 10 are taken as coordinate variables. The propagation operation and the stopping operations are repeatedly carried out on the primary features (2) obtained for eight different directions and orientations. In this way, secondary features (5) shown in FIGS. 9 and 10 are derived. Notice that all the components of each secondary feature have local directions of the boundaries between the strokes of the observed figure (1) shown in FIGS. 9 and 10.

In the foregoing description, each component of secondary features extracted by the complementary feature field can be considered to be physically homogeneous. Because of this nature, the contributions of the components of secondary features can be evenly treated during the calculation of degree of similarity (d) and during the circulation of correlation values for the former calculation. The arithmetic operations performed in the complementary feature field and the resulting secondary features have clear physical meanings and a vast amount of potential.

II. A Second Method

A second method has been devised to offer more powerful pattern identification tool than the method using only primary features. The second method makes use of so-called high-order features (see the Transactions of the Institute of Electronics and Communication Engineers of Japan, D, Volo. J66-D, No. 2, February 1983, pp. 206–213 or Electrical Communication Laboratories Technical Journal, Vol. 26. No. 4, April 1987, pp. 579–587, Nippon Telegraph and Telephone Corporation). This method uses the directions of strokes of characters as primary features. In addition, a combination of plural strokes lying in different directions is regarded as a new feature, or a kind of higher-order feature. The higher-order feature is employed together with the primary features, to recognize patterns more successfully than the case where only primary features are used. This method requires arbitrary and experimental inputs for proper operation. Consequently, its identification abilities are somewhat limited.

III. A Third Method

A third method proposed to improve the recognition method utilizing primary features alone makes use of a combination of various methods (the Transactions of the Institute of Electronics and Communication Engineers of Japan, D, Vol. J68-D. No. 4, April 1986, pp. 773–780). It is a great convenience to be able to utilize known methods. By appropriately combining the contributions of individual methods, better results can be expected than the case where only one method is used. However, such a combination of similar methods based on similar ideas will not yield great improvements.

Of the above-described three methods for improving the recognition method using primary features alone, the first method is considered to have greatest potential for success. That is, primary features indicating the directions of strokes are subjected to spatial arithmetic operations according to certain rules to resolve features with higher resolution.

Unfortunately, there are some disadvantages with the prior art. Since primary features having the directions of strokes are combined or complexities are extracted to obtain secondary or higher-order features, the feature extraction is insufficient to universally perform the identification function. Further, limitations are imposed on the kinds of features identifiable.

With an optical character reader (OCR), character features must be extracted from separated character patterns so that the characters can be recognized. One of the character-extraction devices for that purpose has been proposed in Japanese Patent Laid-Open No. 62-34289. The device propagates waves from a boundary in the character patterns to a background, and then extracts a set of wave heads at the collision point as a two-dimensional character feature. To improve recognition accuracy, methods to extract character features three-dimensionally have been proposed in Japanese Patent Laid-Open No. 2-168367 and Japanese Patent Laid-Open No. 3-184190. However, although the three-dimensional character-feature extraction method is more accurate than that used in the two-dimensional extraction method, processing time is greatly increased.

In view of the foregoing, the present invention has been made. It is an object of the invention to provide a method and apparatus which recognizes patterns at a high recognition rate by improved higher feature order extraction and which, therefore, is able to easily separate even complex characters. It is further an object of the invention to provide a character-feature extraction device that can perform high-speed processing even when the character features are extracted three-dimensionally.

SUMMARY OF THE INVENTION

In accordance with the present invention, the orders of the feature pattern to be recognized are increased as compared with simple patterns of features heretofore used so that the structure of each character may be explicitly represented as the level of detail directed from the outline toward the center of the character.

In one implementation of the invention, continued propagation in one direction is not done; rather a vector function is allowed to propagate to the next element and then stopped there. This operation is repeated a given number of times. The process is ended while leaving the stopped components behind. This process is repeated, and whenever the next process is initiated, the direction of propagation is reversed.

In another implementation of the invention, the components stopped at the end Of each process are preserved as high-order feature patterns. When a character is recognized, the correlation value among the preserved patterns is calculated. At this time, the preserved patterns are used as independent feature quantities.

In this method, the preserved feature patterns are arranged in the time domain. Whenever the patterns are caused to propagate or the direction is reversed, the outermost component is deleted from the feature plane. Therefore, the inner component is left behind. Hence, owing to the above-described two mechanisms, two characters which are similar in structure, such as Kanji characters "自" and "白" or "天" and "大" are separated from each other. Consequently, the recognition rate is enhanced.

In yet another implementation, the relative distance between primary features having certain relations, or the relative distance between concentration gradients of a two-dimensional figure, is calculated, employing propagation and stopping operations. The calculated distance is added to two coordinate variables which represent the two-dimensional figure. As a result, features expressed in the form of vectors are found in a space given by these three coordinate variables.

More specifically, each component of vectors indicating primary features are shifted a given distance in a certain direction, i.e., caused to propagate. If certain conditions for stoppage hold, then the position at which the component is stopped and the accumulated number of propagations of the corresponding vector component are separately copied into a secondary feature storage device. In one scheme the vector component satisfying the stopping conditions is erased after being copied into the secondary feature amount storage device. In another scheme the component is not erased; what is done is simply to reverse the propagation direction.

The data stored in the secondary feature storage device can be expressed by a matrix having three coordinate variables two of which are positional coordinates. The remaining one is the relative distance between character boundaries, i.e., the accumulated number of propagations.

In accordance with the invention, the relative distance between character boundaries, or the accumulated number of propagations, is made explicit in the form of a coordinate variable. Therefore, higher-order features of characters can be extracted. This enables patterns to be recognized with higher accuracy.

In an alternative embodiment of the present invention, a character-feature extraction device is provided which can perform high-speed processing even when the character features are extracted three-dimensionally.

One implementation provides a character-feature extraction device characterized in that the boundary features of the character patterns are broken down into vectors in eight directions which are stored in memory regions by vector direction, each vector is propagated into its respective direction with picture elements, collisions among the vectors are detected via propagation processing, and furthermore, collision positions in each vector direction are extracted for the number of propagations to make them three-dimensional pattern features, which comprise a motion-flag memory having regions corresponding to the patterns for each vector direction; a stopping-flag memory having regions corresponding to the patterns for each vector direction; a means to turn the vector extraction positions on the patterns into flags according to their directions, and to store them in the corresponding regions of the motion-flag memory; a means to move flag values in the motion-flag memory via propagation processing into their respective vector directions; a means to read the flag values sequentially from the first address to the final address in the motion-flag memory and the stopping-flag memory after propagation processing, and to determine whether there are flag values representing the existence of vectors in the flag values of the above addresses in the flag memory regions with other vectors having a phase difference of more than 90 degrees, and in addresses of the upper, lower, right, and left parts thereof; a means to reset the flag values in said addresses in the self-moving flag memory, and at the same time, set the flags in said addresses in the regions of the stopping-flag memory with its vectors in the same direction, if there are vector flag values in said addresses of other flag memory regions; and a means to convert the flag values in each stopping-flag memory region and each motion-flag memory region into vector values via determination processing after propagation processing, and to output the vector values as three-dimensional features.

A second implementation provides a character-feature extraction device characterized in that the boundary features of character patterns are broken down into vectors in eight directions and are stored in memory regions by vector direction, each vector is propagated into its respective direction with picture elements, collisions among the vectors are detected via propagation processing, and furthermore, collision positions in each vector direction are extracted for the number of propagations to make them three-dimensional pattern features, which comprise a motion-flag memory having regions corresponding to the patterns for each vector direction; a means to turn the vector extraction positions on the patterns into flags according to their directions, and to store them in the corresponding regions of the motion-flag memory; a means to move flag values in the motion-flag memory via propagation processing into their respective vector directions; a means to read the flag values sequentially from the first address to the final address in the motion-flag memory after propagation processing, and to determine whether there are flag values representing the existence of vectors in the flag values of the above addresses in the flag memory regions with other vectors having a phase difference of more than 135 degrees, and in addresses of the upper, lower, right, and left parts thereof; and a means to convert the flag values in the motion-flag memory regions, where flag values representing the existence of the vectors have been detected, into vector values via determination processing after propagation processing, and to output the vector values as three-dimensional features.

A third implementation provides a character-feature extraction device characterized in that the boundary features of character patterns are broken down into vectors in eight directions and are stored in memory regions by vector direction, each vector is propagated into its respective direction with picture elements, collisions among the vectors are detected via propagation processing, and furthermore, collision positions in each vector direction are extracted for the number of propagations to make them three-dimensional pattern features, which comprise a motion-flag memory having regions corresponding to the patterns for each vector direction; a means to turn the vector extraction positions on the patterns to flags according to their directions, and to store them in the corresponding regions of the motion-flag memory; a means to move flag values in the motion-flag memory via propagation processing into their respective vector directions; a means to read the flag values sequentially from the first address to the final address in the motion-flag memory and the stopping-flag memory after propagation processing, and to determine whether there are flag values representing the existence of vectors in the flag values in the above addresses of the flag memory regions with other vectors having a phase difference of more than 135 degrees; a means to set flags in said addresses in the regions of the flag memory with vectors that have a phase that is different by 180 degrees, if there are vector flag values in said addresses of other flag memory regions; and a means to convert the flag values in the motion-flag memory regions, where flag values representing the existence of the vectors have been detected, into vector values via determination processing after propagation processing, and to output the vector values as three-dimensional features.

BRIEF DESCRIPTION OF THE DRAWINGS

FIG. 1 is a flowchart illustrating a conventional method of recognizing patterns;

FIG. 2 is a flowchart illustrating another conventional method of recognizing patterns;

FIG. 3 is a flowchart illustrating a further conventional method of recognizing patterns;

FIG. 4 is a diagram illustrating unit vectors lying in different directions;

FIGS. 5a and 5b illustrate masks used for spatial differentiation;

FIGS. 6a–6d illustrate coupling coefficient masks;

FIGS. 7a and 7b illustrate the conventional concept of propagation and stopping operations;

FIG. 14 is a diagram illustrating inventive conditions for stopping propagation;

FIGS. 15a–15d are diagrams illustrating a feature extraction method according to the invention;

DETAILED DESCRIPTION OF THE PREFERRED EMBODIMENTS

Figure 11:
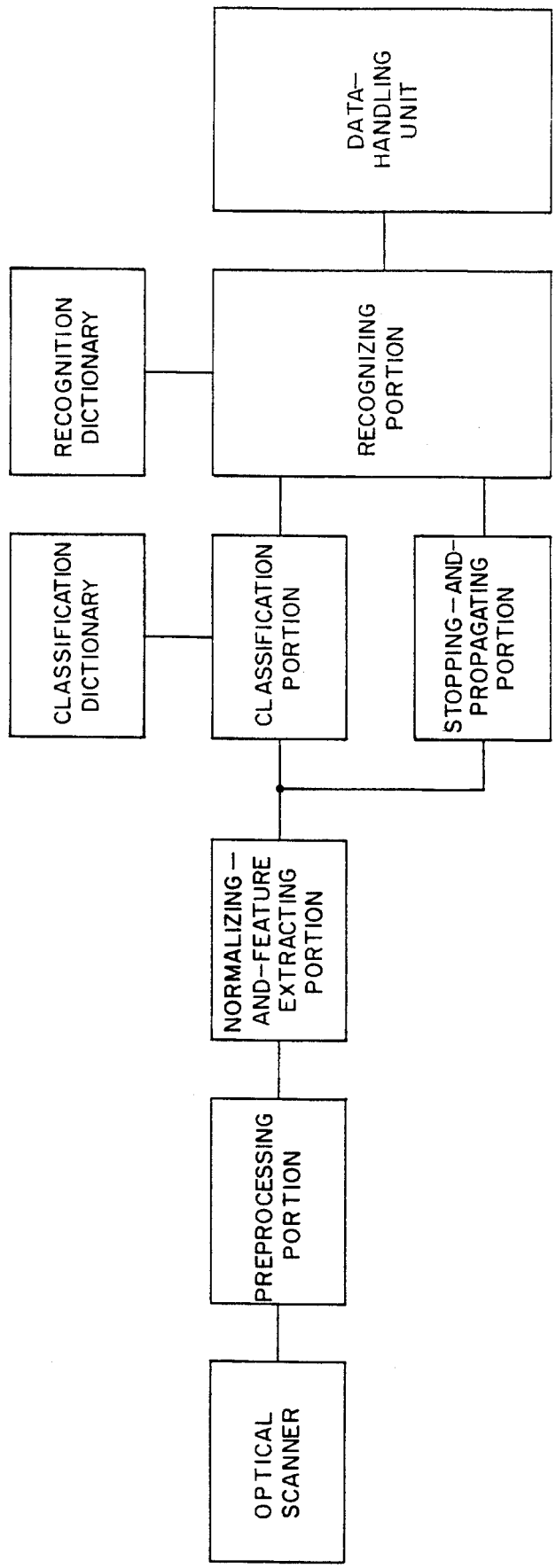
FIG. 11 as a block diagram of a pattern recognition apparatus according to the invention.

Referring to FIG. 11, there is shown a pattern recognition apparatus embodying the concept of the present invention. The apparatus comprising an optical scanner 1, a preprocessing portion 2, a normalizing-and-feature extraction portion 3, a classification portion 4, a classification dictionary 5, a stopping-and-propagating portion 6, a recognizing portion 7, a recognition dictionary 8, and a data-handling unit 9.

In this embodiment, the image of a document is read by the optical scanner 1. The output signal from the scanner is fed to the preprocessing portion 2, where each individual character is separated. Data about one separated character is sent to the normalizing-and-feature extraction portion 3, which calculates the amount of normalized features of low order. The calculated amount is furnished to the classification portion 4 and also to the stopping-and-propagating portion 6. The stopping-and-propagating portion 6 recognizes patterns by a recognition method according to the invention, and calculates the amount of features of high order in the background field of character patterns and sends it to the recognition portion 7. The classification portion 4 classifies each unknown pattern into major categories, based on the amount of features of low order, by using a classification dictionary. Similar characters up to the 16th order are fed as candidate categories to the recognizing portion 7, which then calculates the degree of dissimilarity between the amount of features of high order (high m) and the amount of the candidate categories stored in the recognition dictionary pleted. We express the result in terms of $Q_k^{(n)}(i, j)$. The algorithm is given by $$Q_k^{(n)}(i+\omega_m \cdot \lambda_k, j+\omega_m \cdot \mu_k) = Q_k^{(n-1)}(i,j)$$

where $\omega_m = (-1)^{(m+1)}$ and $Q_k^{(0)}(i, j) = Q_k(i, j)$

In these equations, $\lambda_k$ and $\mu_k$ indicate directions in which patterns are stepped in vector planes; $\omega_m$ indicates that the direction is reversed every other time. The values of $\lambda_k$ and $\mu_k$ are listed in Table 2.

TABLE 2

| | Direction of Propagation of Vector Component | | | | | | | | | | | |
|---|---|---|---|---|---|---|---|---|---|---|---|---|
| unit vector number | 1 | | 2 | | 3 | | 4 | | 5 | | 6 | 7 | 8 |
| unit vector direction | ← | | ↙ | | ↓ | | ↘ | | → | | ↗ | ↑ | ↖ |
| apparent plane number | 1 | 2 | 3 | 4 | 5 | 6 | 7 | 8 | 9 | 10 | 11 | 12 |
| propagation direction | ← | ↓ | ← | ↓ | → | ↓ | → | ↑ | → | ↑ | ← | ↑ |
| $\lambda_k$ | −1 | 0 | −1 | 0 | 1 | 0 | 1 | 0 | 1 | 0 | −1 | 0 |
| $\mu_k$ | 0 | 1 | 0 | 1 | 0 | 1 | 0 | −1 | 0 | −1 | 0 | −1 |

8. Candidate categories up to the 10th order are extracted in order of increasing degree of similarity. The recognizing portion 7 delivers the extracted categories as the results of recognition to the data-handling unit 9 consisting of a personal computer or the like.

Figure 12:
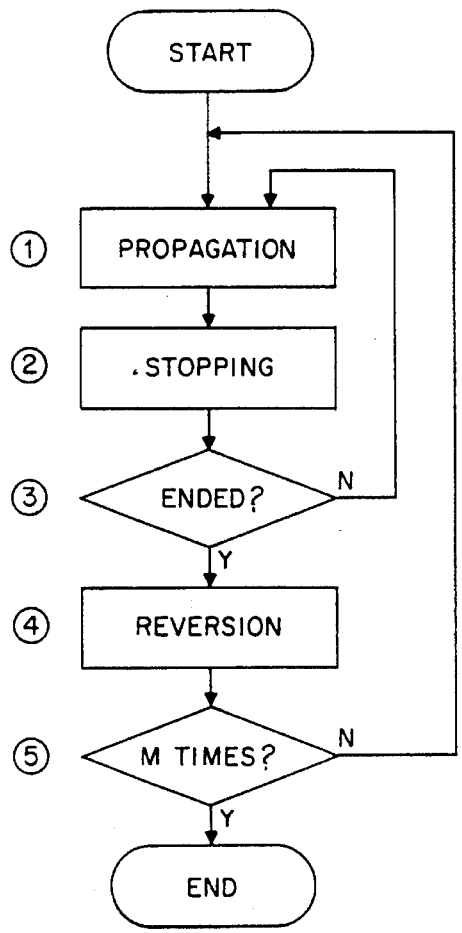
FIG. 12 is a flowchart illustrating a first implementation of the invention.

The stopping-and-propagating portion 6 calculates the amount of features of high order in accordance with the teachings of the invention as follows. FIG. 12 is a flowchart illustrating a first implementation of the invention. This flowchart corresponds to the flowchart of FIG. 3, but similar portions are omitted from FIG. 12; only dissimilar portions corresponding to step (i) of FIG. 3 are shown.

First, patterns $Q_k(i, j,)$ of the line segments of a character are caused to propagate in a certain direction (step (1)). The patterns are stopped (step (2)). This series of operations is repeated a given number of times. Subsequently, the patterns do not continue to propagate in one direction, but they are caused to propagate in the opposite direction to the preceding direction after components not stopped are removed from the stopped feature patterns (step (4)). The vector component of the reverse sense is caused to propagate and be stopped. This series of operations is also repeated a given number of times (step (5)). In this implementation, every stopped feature pattern is stored whenever the direction is reversed.

The inversion is repeated m times. The number of inversions is determined based on the capacity of the computer memory. Sometimes, the inversion is repeated four or five times. In other cases, it is repeated until all the patterns are exhausted. Normally, the number of repetition is 4 to 8.

More specifically, the propagation operation is similar to conventional propagation operation discussed in the prior art except that the direction of propagation is reversed every time. Horizontal and vertical components are each resolved into components oriented in the same direction as the vector component. Oblique components are each resolved into a horizontal component and a vertical component. Then, they are moved a unit distance. Although 8 directional components existed originally, 12 planes exist for the convenience of arithmetic operation as shown in Table 2. After patterns are reversed M times, N propagation operations are completed. We express the result in terms of $Q_k^{(n)}(i, j)$. The algorithm is given by The stopping operation is now described. This operation is similar to the conventional stopping operation described in the prior art except that the direction for the stopping conditions is reversed every time. Also, the following modifications are added to the stopping conditions themselves to make the structure of each character identifiable sequentially from the outline to the central portion. A first stopping condition is applied when a pair of vector components which are identical in direction but opposite in direction exists at the same coordinate.

Secondly, when these two vector components face each other in the same direction of propagation and are located at neighboring coordinates, they are no longer propagated. That is, if the vector components not existing at the same coordinate because of quantization of space were caused to propagate once more, then they would pass by each other.

Thirdly, when a pair of vector components forming an angle exceeding 135° to each other exists at the same coordinate, they are stopped.

Fourthly, a movement of a vector component in a propagation operation is stopped when another stationary vector component being same in direction but opposite in sense or forming an angle exceeding 135° to the moving vector component exists on the same coordinate system. Thus, vector components tilted at right angles to each other meet none of the stopping conditions, unlike in the prior art method. Those neighboring vector components which have been already stopped satisfy none of the stopping conditions.

Figures 8, 9:
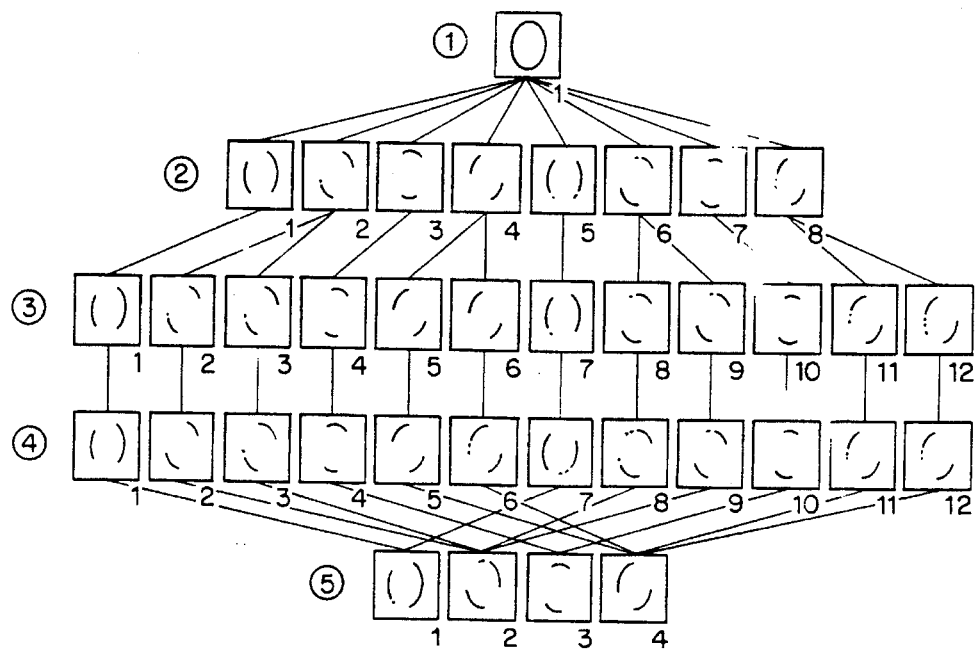
FIG. 8 is a diagram illustrating the conventional conditions for stopping propagation.
FIG. 9 is a diagram illustrating one way in which feature components are extracted from strokes by the conventional method.
Figure 10:
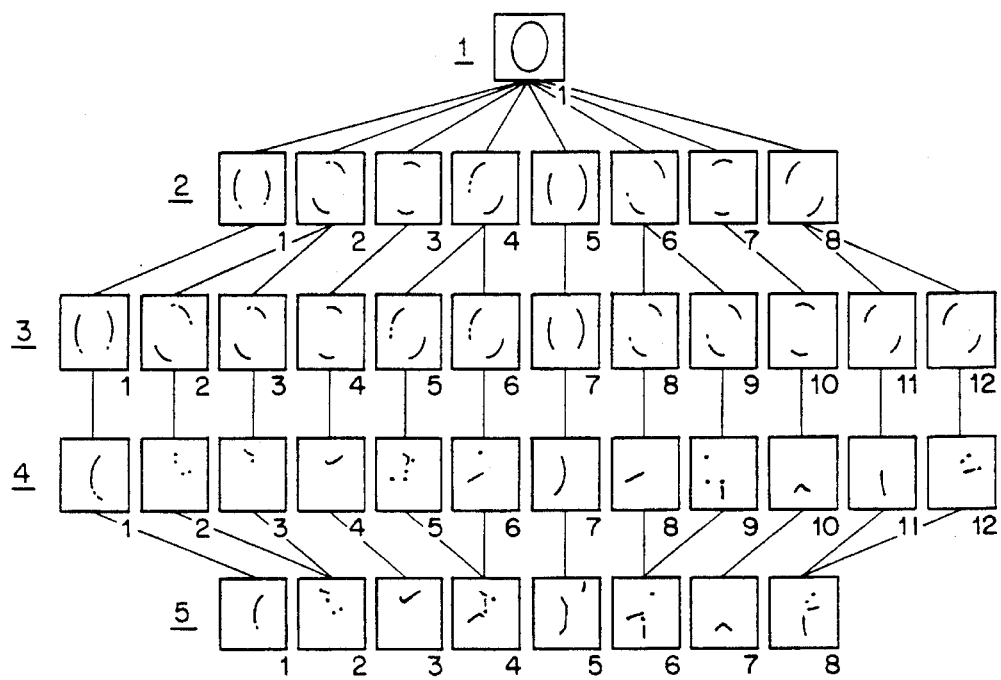
FIG. 10 is a diagram illustrating one way in which background components are extracted by the conventional method.
Figure 13A:
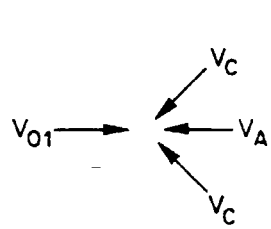
FIGS. 13a and 13b illustrate the inventive concept of a stopping operation.
Figure 13B:
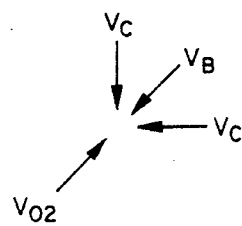

FIGS. 13a and 13b illustrate the concept of the stopping operation according to the invention. The stopping conditions can be summarized as shown in FIG. 14. FIGS. 13a, 13b and 14 should be compared to FIGS. 7a, 7b and 8. As can be seen by comparing FIGS. 13a, 13b and 14 with FIGS. 7a, 7b and 8, any stopping condition does not hold for vector components meeting at 90 degrees.

FIGS. 15a–15d illustrate a series of processes executed in accordance with the invention. FIG. 15a shows the results of processing of a handwritten Kanji character "白". FIG. 15b shows the results of processing of a handwritten Kanji character "自". FIG. 15c shows the results of processing of a handwritten Kanji character "大". FIG. 15d shows the results of processing of a handwritten Kanji character "天". The first step of each of FIGS. 15a–15d shows the original pattern. The second step shows the amount of primary features, and so on. The amount of each order is the superposition of every pattern in eight planes (12 planes if intermediate results are added) to facilitate visual inspection. That is, the amount of each order is given by $$R1(i, j, m) = R(i, j, m)$$

The amounts of all the orders are arranged vertically according to the value of m.

We now compare FIGS. 15a and 15b. In FIG. 15a, patterns are left only up to m=3. In FIG. 15b, patterns remain up to m=4. Although the number of the strokes of the character "白" differs from the number of the strokes of the character "自" by only one, these two characters can be distinguished from each other distinctively by the order of inversion m. FIG. 15c is compared with FIG. 15d similarly. In FIG. 15c, patterns are left only up to m=1. In FIG. 15d, patterns remain up to m=2. Thus, the character "大" can be distinctively distinguished from the character "天". In this example, the order m goes to 7, but no patterns are left when the order m has reached 5. Therefore, the process can be ended with m=4.

A computer carries out the above process in the manner described below. Whenever a stopping operation is performed, the stopped component is stored in a different storage location R(i, j, k, m). In a reversing operation, the contents of this storage location are mapped into $Q_k^{(n)}(i, j)$. To reverse the direction, a table indicating propagation directions and stopping conditions is prepared. The data is processed by referring to this table. The table is rewritten, or a pointer used to refer to the table is replaced with another.

Arithmetic operations for treating obscurity are performed in the same way as in the prior art techniques. As a result, data G(i, j, k, m) about patterns derived by extracting features are obtained. The data clearly represents the structure.

The degree of similarity is calculated to find the normalized correlation values between data G(i, j, k, m) about unknown patterns and data about reference patterns previously prepared by other means. Since the data expresses the structure, the following four degrees of similarity can be defined:

(1) The conventional feature pattern is replaced by a feature pattern according to the invention. Then, the degree of similarity is calculated. Let $F^{(l)}(i, j, k, m)$ be a reference pattern. To clarify the structure, we compute the degree of similarity $S_G^{(l)}$ using the formula:

$$S_G^{(l)} = \frac{(F^{(l)}, G)}{\|F^{(l)}\| \cdot \|G\|} \quad (10)$$

where
$$(F^{(l)}, G) = \Sigma_i \Sigma_j \Sigma_k \Sigma_m G_k(i, j, k, m) \cdot F_k^{(l)}(i, j, k, m) \quad (11)$$

$$\|F^{(l)}\| = \sqrt{(F^{(l)}, F^{(l)})} \quad (12)$$

$$\|G\| = \sqrt{(G, G)} \quad (13)$$

Weights can also be added to vector planes to calculate the degree of similarity as follows:

$$(F^{(l)}, G) = \Sigma_i \Sigma_j \Sigma_k \Sigma_m W_k \cdot G(i, j, k, m) \cdot F^{(l)}(i, j, k, m) \quad (14)$$

(2) The degree of similarity is calculated at each different level or depth (m) in the calculation. The sum of the degrees of similarity is defined as the general degree of similarity.

$$S_G^{(l)} = \Sigma_m S_{Gm}^{(l)} \quad (15)$$

$$S_{Gm}^{(l)} = \frac{(F^{(l)}, G)_m}{\|F_m^{(l)}\| \cdot \|G_m\|} \quad (16)$$

$$(F^{(l)}, G)_m = \Sigma_i \Sigma_j \Sigma_k G(i, j, k, m) \cdot F^{(l)}(i, j, k, m) \quad (17)$$

$$\|F_m^{(l)}\| = \sqrt{(F_m^{(l)}, F_m^{(l)})} \quad (18)$$

$$\|G_m\| = \sqrt{(G_m, G_m)} \quad (19)$$

$$G_m(i, j, k) = G(i, j, k, m) \quad (20)$$

(3) Shallow planes of depth m are classified into major categories. Deep planes (greater m) are used as features for recognizing details. Specifically, rough classification is made with $S_{Gm}^{(1)}$, an the candidates are reduced with $S_{Gm}^{(2)}$. Finally, the character is determined using $S_{Gm}^{(3)}$. See (16) above (4) The difference in feature between depth m and depth m–2 is calculated, and then the degree of similarity is computed.

$$H_m(i, j, k) = G_m(i, j, k) - G_{m-2}(i, j, k) \quad (21)$$

$$S_G^{(l)} = \frac{(F^{(l)}, H)}{\|F_m^{(l)}\| \cdot \|H\|} \quad (22)$$

$$(F^{(l)}, H) = \Sigma_i \Sigma_j \Sigma_k \Sigma_m H(i, j, k, m) \cdot F^{(l)}(i, j, k, m) \quad (23)$$

$$\|F_m^{(l)}\| = \sqrt{(F_m^{(l)}, F_m^{(l)})} \quad (24)$$

$$\|H\| = \sqrt{(H, H)} \quad (25)$$

Figure 16:
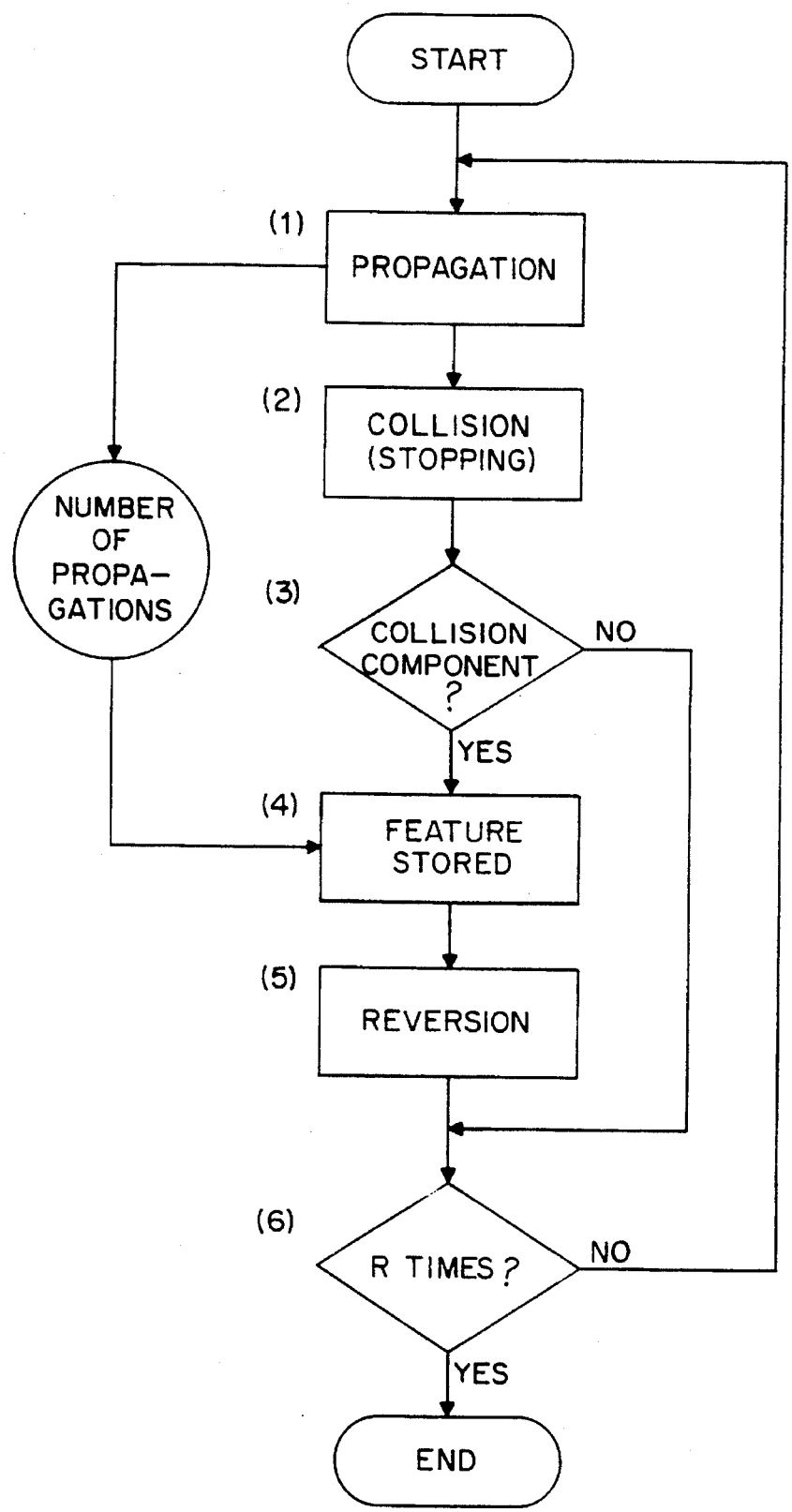
FIG. 16 is a flowchart illustrating a second implementation of the invention.

FIG. 16 is a flowchart illustrating a second implementation of the invention, and in which only those steps which differ from the prior art process shown in FIGS. 1–3 and are used to extract high-order features are shown. First, the patterns of line segments which constitute a character and exist in eight different directions are caused to propagate in a given direction (step (1)). Then, a collision operation or stopping operation is performed (step (2)). A decision is made to see whether any component satisfies the collision condition (step (3)). If not so, control goes back to step (1) through step (6), or the process is ended. If any component satisfies the collision condition, it is stored in a memory (step (4)). At this time, the number of propagations performed until a collision takes place is also stored. Then, the stopped component is shifted to a feature plane where the component is caused to propagate in the direction opposite to the previous direction (step (5)). Subsequently, control returns to step (1) through step (6), or the process ends. In this implementation, components fulfilling the condition of collision are stored together with their numbers of propagations. The propagation and the inversion of the direction are repeated a given number of times (R times), depending on the pattern to be identified.

In the above example, if any component brings about a collision, then the direction of propagation is reversed. Instead of this reversing operation, an erasure operation can be performed. In particular, if any component satisfies the condition of collision, then the component is stored together with the number of propagations. Subsequently, the component is deleted.

The propagation operation and the stopping operation performed in this second example are essentially the same as the operations of the first example and, therefore, they will not be described below.

Figure 17D:
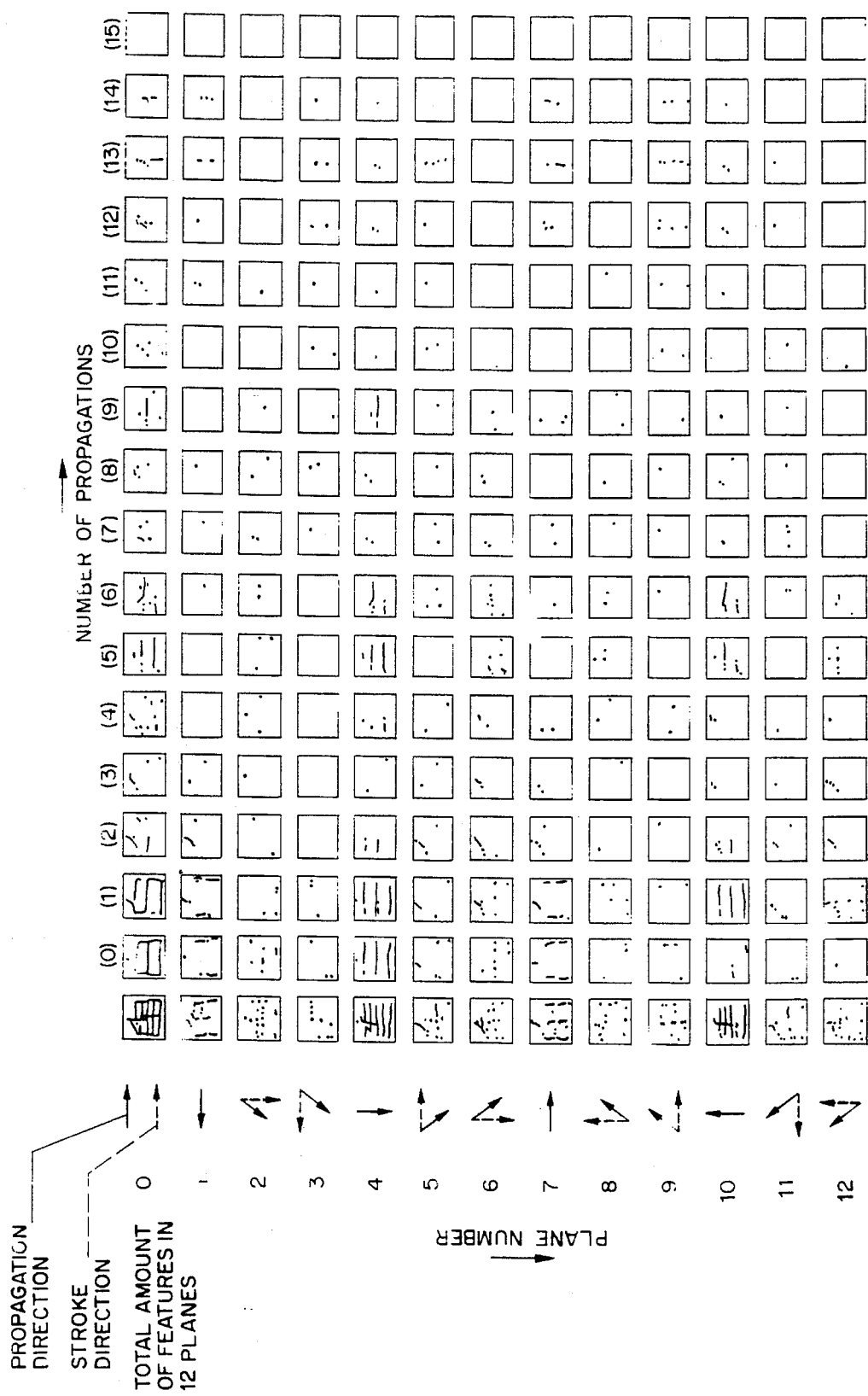
FIGS. 17A–17D are diagrams particularly illustrating a feature extraction method according to the second implementation of the invention.
Figure 17C:
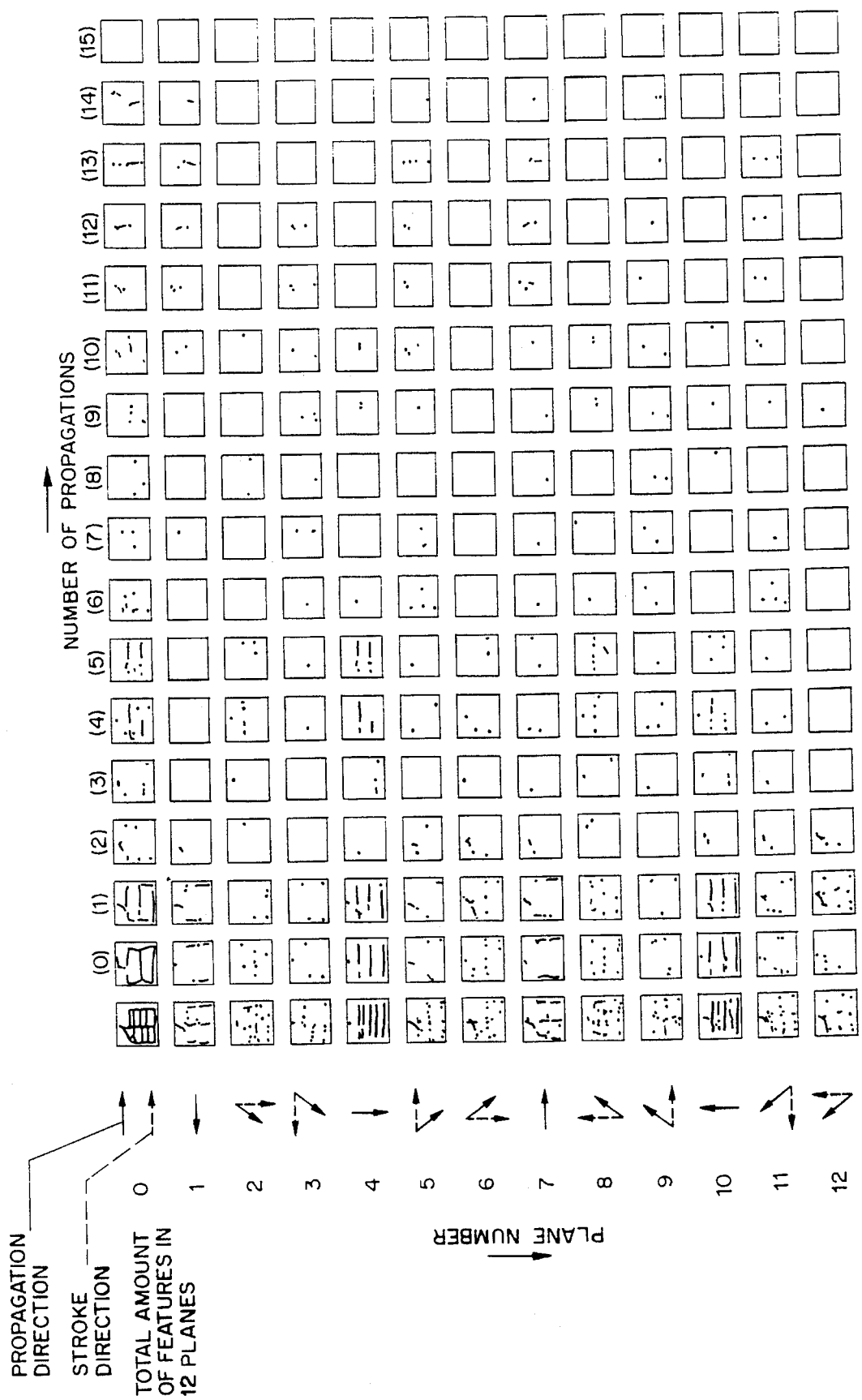
Figure 17B:
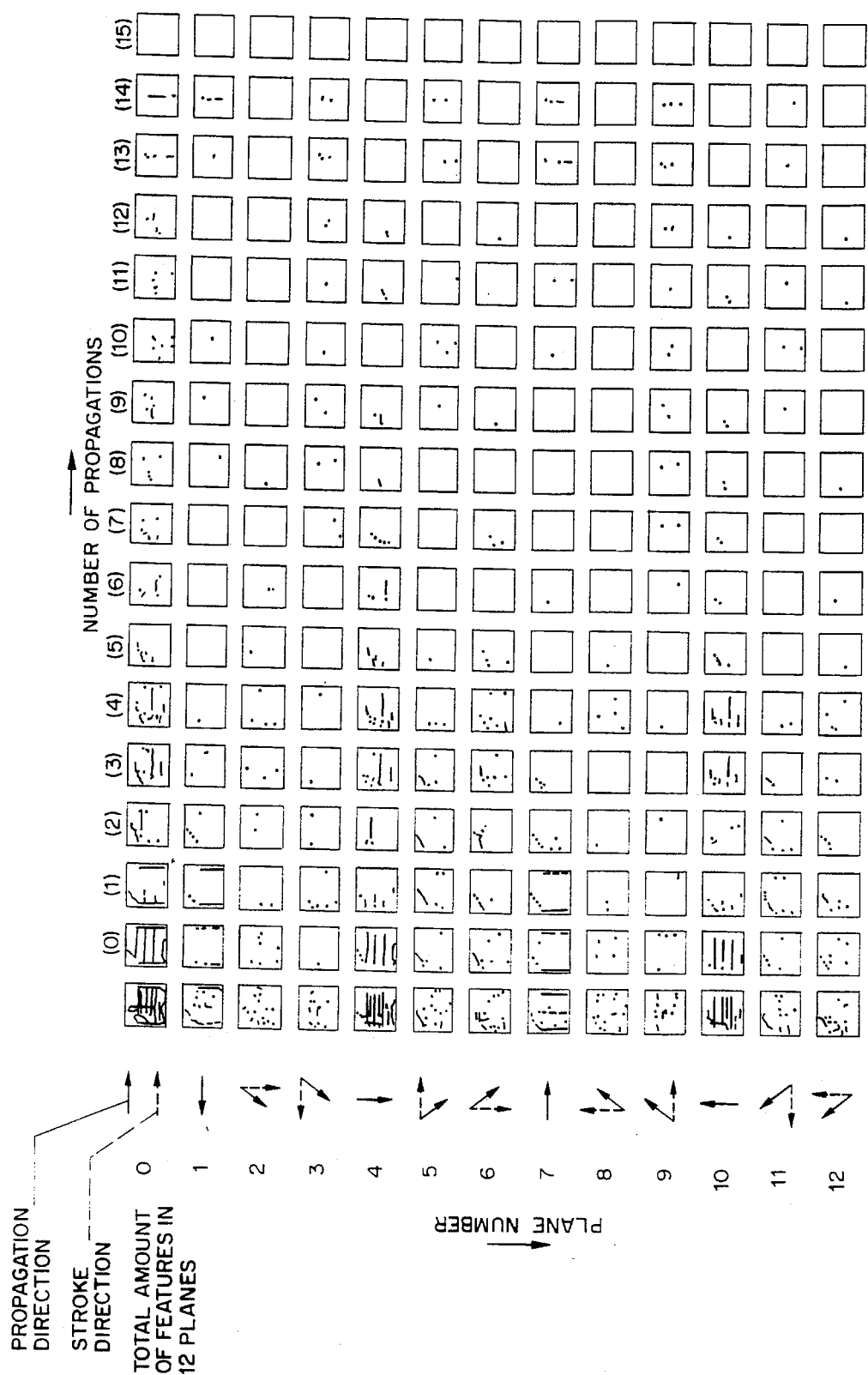
Figure 17A:
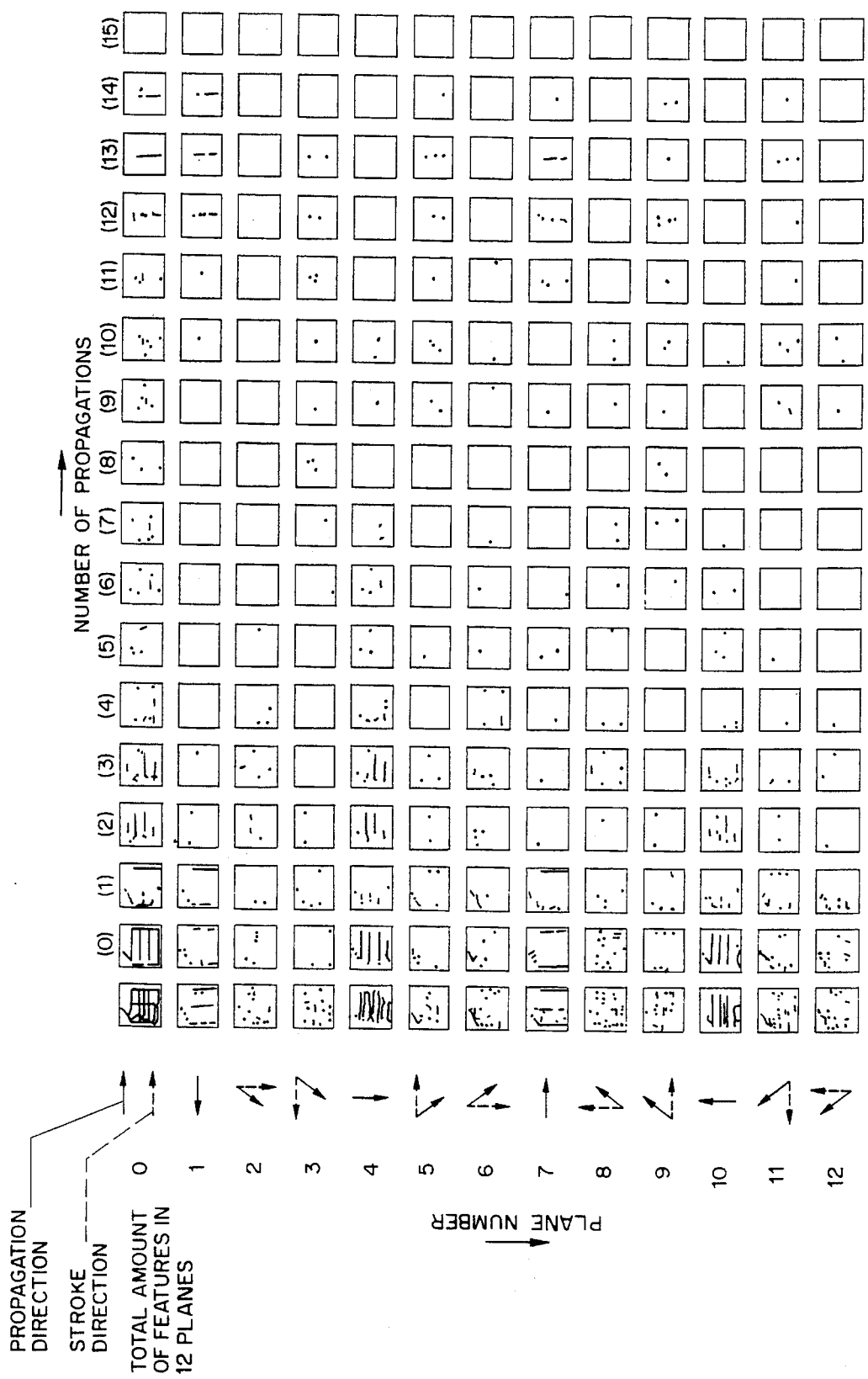

An example in which propagation operations and reversing operations are carried out for a Kanji character "自" is shown in FIG. 17A. Another example in which propagation operations and stopping operations are effected for the same character "自" is shown in FIG. 17B. Examples in which similar operations are performed about a Kanji character "白" are shown in FIGS. 17C and 17D. In these examples, each character is read with a resolution of 30×30 elements. Accordingly, the maximum number of propagations R is 15.

The columns, or the vertical array, show the amounts of vector features in 12 planes in each of which a unit vector propagates in a different direction. The uppermost row shows the total amount of vector features, obtained by summing up the vertically arranged twelve elements. The rows, or the horizontal array, show vector features in 12 planes which are derived by causing the features to propagate a unit distance from the 12 planes immediately after the features are transformed into vectors. Upon traveling the unit distance corresponding to one element of a matrix, the features are stopped. The left-most column shows the total amount of vector features, obtained by totaling the horizontally arranged elements. It can be seen from these diagrams that as the number of propagations is increased from 0, the components diverging outward increase and, at the same time, the amount of features decrease. Although only stopped components are shown, those components which are now propagating can be known by calculation.

In the first implementation of the invention, the order of feature patterns employed is higher than conventional. The structure of each character can be explicitly represented in terms of depth (m) measured from the outer edges of the pattern toward the center. As a result, the following advantages can be expected.

(1) Features are not caused to propagate only in one direction. The propagation operation and the stopping operation are repeated a given number of times for each matrix element. Then, the operations are stopped except for the stopped components. This process is repeated in such a way that the direction of propagation is reversed whenever the next operation is repeated. That is, the reversing operation is repeated. Consequently, higher-order feature amounts can be extracted than conventional processing.

(2) Whenever any component comes to a halt at the end of an operation, it is stored as a high-order feature pattern. When the character is recognized, every stored pattern is taken as an independent feature, and the correlation value between the independent features is calculated. As a result, the character can be recognized in a stepwise fashion, i.e., from rough recognition toward detailed recognition. Hence, the recognition is performed more effectively.

(3) Where stored feature patterns are arranged at successive instants; of time, whenever the direction is reversed, the outermost line is deleted from the feature plane. Therefore, the central or inner portions are left behind. When a simple character having a few strokes is recognized, only the components of patterns of low order of inversion (m) are left. The difference in stroke number makes feature patterns more distinctive. Because of the advantages (1) and (2) above, characters resembling each other in structure such as "自" and "白" or "天" and "大" are separated well from each other.

In this second implementation of the invention, the relative distance between character boundaries is made explicit in the form of a coordinate variable. Therefore, the amount of features of the second and higher orders can be increased satisfactorily. Hence, patterns can be recognized more accurately.

Regarding an alternative embodiment of the present invention, the following implementations of the present invention will herein be described below:

The first implementation incorporates a motion-flag memory having regions corresponding to the patterns for each vector direction and a stopping-flag memory having regions corresponding to the patterns for each vector direction. Vector extraction positions on the patterns are turned to flags according to their directions, and are stored in the corresponding regions of the motion-flag memory. Flag values in the motion-flag memory via propagation processing are moved into their respective vector directions. Flag values are read sequentially from the first address to the final address in the motion-flag memory and the stopping-flag memory after propagation processing, and it is determined whether there are flag values representing the existence of vectors in the flag values in the above addresses of the flag memory regions with other vectors having a phase difference of more than 90 degrees, and in addresses of the upper, lower, right, and left parts thereof. If there are vector flag values of said addresses in other flag memory regions, the flag values of said addresses in the self-moving flag memory are reset, and at the same time, the flags of said addresses in the regions of the stopping-flag memory with its vectors in the same direction are set. The flag values in each stopping-flag memory region and each motion-flag memory region are converted into vector values via determination processing after propagation processing, and the vector values are output as three-dimensional features.

The second implementation incorporates a motion-flag memory having regions corresponding to the patterns for each vector direction. Vector extraction positions on the patterns are turned into flags according to their directions, and are stored in the corresponding regions of the motion-flag memory. Flag values in the motion-flag memory via propagation processing are moved into their respective vector directions. The flag values are read sequentially from the first address to the final address in the motion-flag memory after propagation processing, and it is determined whether there are flag values representing the existence of vectors in the flag values of the above addresses in the flag memory regions with other vectors having a phase difference of more than 135 degrees, and in addresses of the upper, lower, right, and left parts thereof. The flag values in the motion-flag memory regions, where flag values representing the existence of the vectors have been detected, are converted into vector values via determination processing after propagation processing, and the vector values are output as three-dimensional features.

The third implementation incorporates a motion-flag memory having regions corresponding to the patterns for each vector direction. Vector extraction positions on the patterns are turned into flags according to their directions, and are stored in the corresponding regions of the motion-flag memory. Flag values in the motion-flag memory via propagation processing are moved into their respective vector directions. The flag values are read sequentially from the first address to the final address in the motion-flag memory and the stopping-flag memory after propagation processing, and it is determined whether there are flag values representing the existence of vectors in the flag values of the above addresses in the flag memory regions with other vectors having a phase difference of more than 135 degrees. If there are vector flag values of said addresses in other flag memory regions, the flags of said addresses in the flag memory regions with vectors having a phase that is different by 180 degrees are set. The flag values in the motion-flag memory regions, where flag values representing the existence of the vectors have been detected, are converted into vector values via determination processing after propagation processing, and the vector values are output as three-dimensional features.

Below, the implementations of an alternative embodiment of the present invention are explained with reference to the appended drawings.

Figure 18:
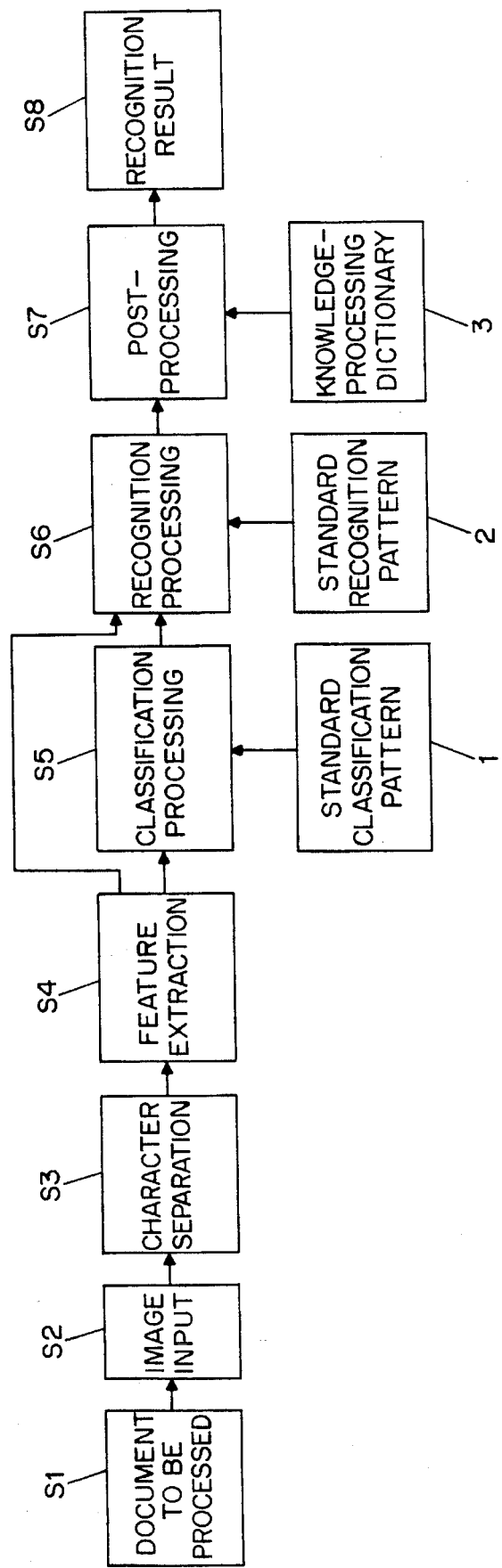
FIG. 18 is a flow chart showing a sample processing by an Optical Character Reader (OCR) using the present invention.

FIG. 18 is a flow chart showing one example of processing by an OCR that incorporates the present invention. As the figure shows, when a document to be processed is input (S1), its image is input as binary images (S2), and images of each character are separated (S3). Then, the features of the characters are extracted (S4), and are classification processed (S5) or recognition processed (S6). Classification processing (S5) largely classifies the features with reference to a standard classification pattern (1), and sends the results to the recognition processing (S6) stage. Recognition processing (S6) recognizes the patterns with reference to a standard recognition pattern (2), and sends the result to the post-processing (S7) stage. Furthermore, the post-processing (S7) stage adjusts the consistency between the former and latter patterns with reference to the knowledge-processing dictionary (3) to obtain the necessary recognition result (S8). The present invention has incorporated the feature-extraction processing (S4) among these processes.

Figure 19:
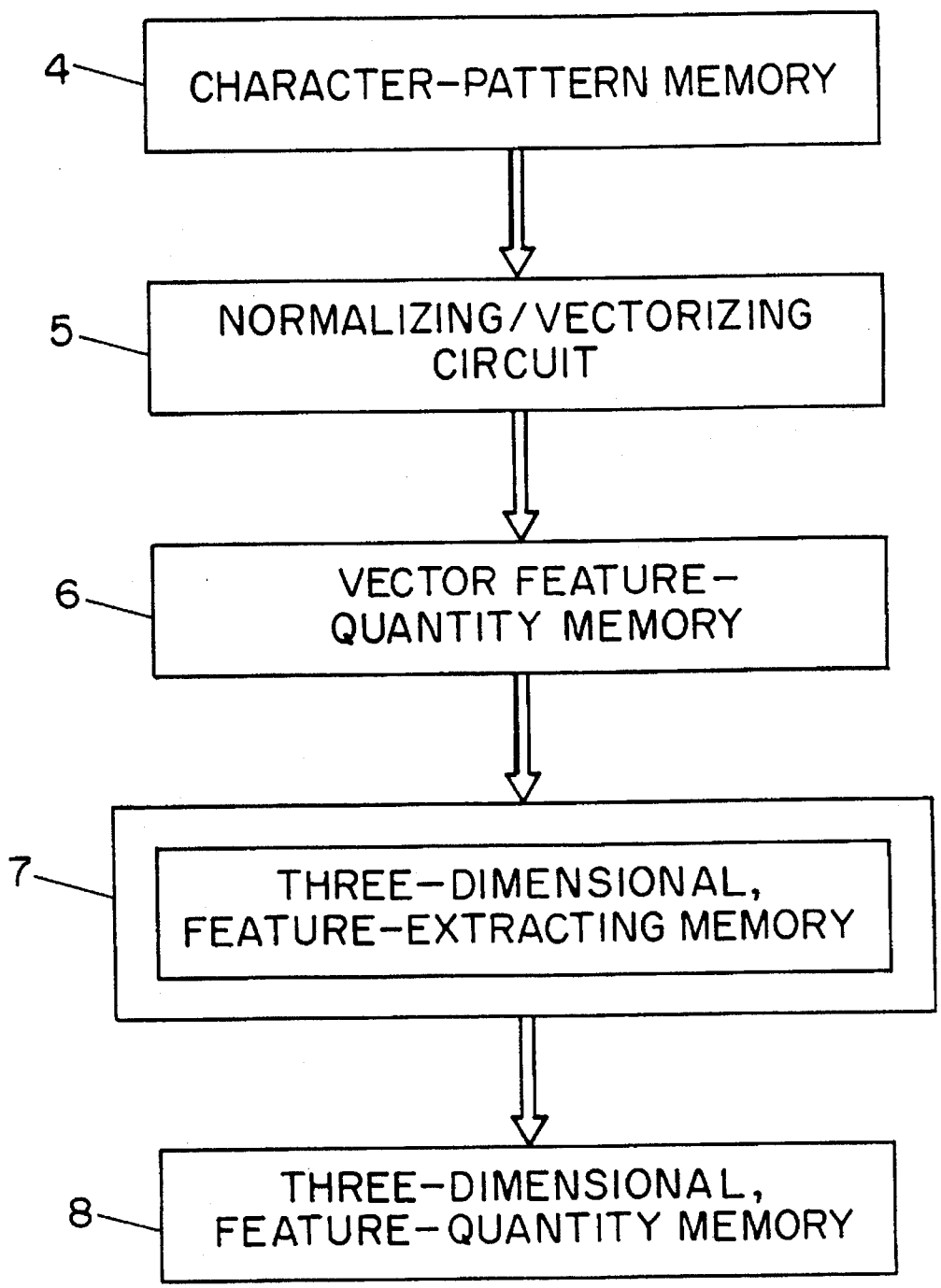
FIG. 19 is a block diagram showing a hardware configuration of a feature-extraction portion according to the present invention.

FIG. 19 is a block diagram showing the hardware configuration of the feature-extraction section. In the figure, the numeral (4) is an example of character-pattern memory, (5) is a normalizing/vectorizing circuit, (6) is a vector feature-quantity memory, (7) is a three-dimensional, feature-extraction circuit, which is a special feature of the present invention, and (8) is an example of three-dimensional, feature-quantity memory.

Figure 20:
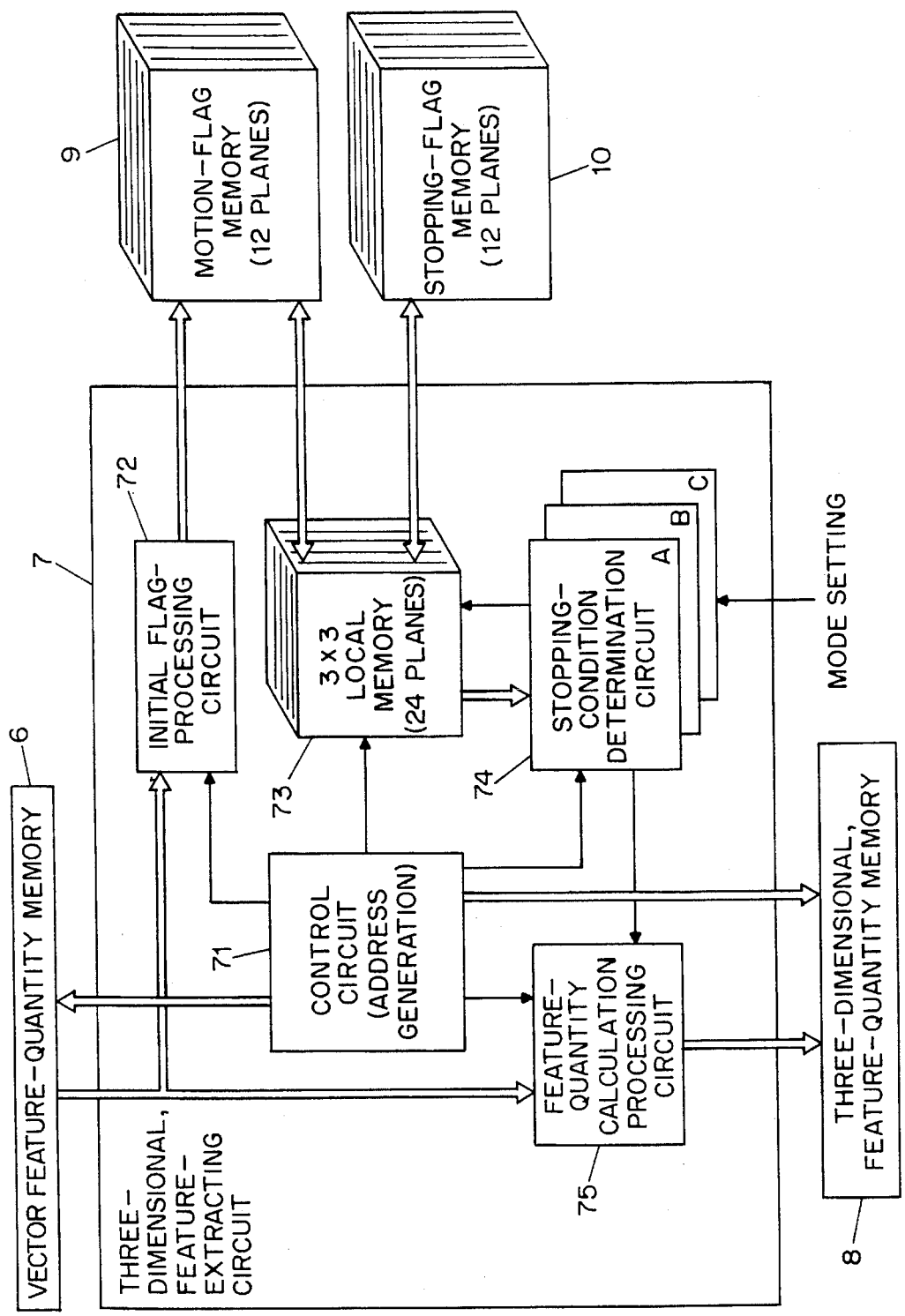
FIG. 20 is a block diagram showing the essential parts of one implementation of an alternative embodiment of the present invention.

FIG. 20 is a block diagram showing the essential parts of one implementation of the present invention. In this figure, a control circuit (71) in the three-dimensional, feature-extraction circuit (7) controls the operation of an initial flag-processing circuit (72), local memory (73), a stopping-condition determination circuit (74), a feature-quantity calculation processing circuit (75) to administer the whole arrangement, and at the same time, generates addresses to control reading and writing relative to the vector feature quantity memory (6) and the three-dimensional, feature-quantity memory (8). The initial flag-processing circuit (72) follows instructions from the control circuit (71) to flag vector data which is a low-order feature sent from the vector feature-quantity memory (6), and writes the vector data into a motion-flag memory (9) by using its vector components. Specifically, the flag becomes one if there is a vector, and zero if there is no vector. The motion-flag memory (9) has a memory region consisting of 12 planes, and is rewritten via the propagation processing described later so that flag values in the memory region are sequentially moved one address at a time into the vector direction. The memory has 12 planes because the vector components are broken down and indicated in eight directions among which the diagonal directions are indicated with two synthesized directions, thus requiring 12 planes in all. A stopping-flag memory (10) consists of 12 planes as does the motion-flag memory (9), and flag values are set in addresses with the established stopping condition by means of the stopping-condition determination processing described later. Flag values for addresses in eight directions surrounding a noted address in as many as 24 planes are collectively read and accommodated in the local memory (73) from the motion-flag memory (9) and the stopping-flag memory (10) according to instructions from the control circuit (71). The noted address then moves sequentially from the first address to the final address. The stopping-condition determination circuit (74) determines whether a stopping condition has been established for the values accommodated in the local memory (73) according to the instructions from the control circuit (71). According to the determination results, the stopping-condition determination circuit (74) rewrites the flag values in the stopping-flag memory (10) and, if required, the flag values in the motion-flag memory (9) via the local memory (73), and then sends the determination results to the feature-quantity calculation processing circuit (75). The stopping-condition determination circuit (74) has three circuits (74A), (74B) and (74C), so that any one of three kinds of modes with different stopping conditions, namely, a completion mode, a permeation mode, and a reflection mode can be selected by external setting. The feature-quantity calculation processing circuit (75) receives instructions from the control circuit (71) to generate a three-dimensional feature quantity from a low-order vector feature quantity in the vector-feature quantity memory (6) according to the determination result in the stopping-condition determination circuit (74) and the flag data in the flag memory (9) or (10), and sends the three-dimensional feature quantity to the three-dimensional, feature-quantity memory (8).

Figure 21:
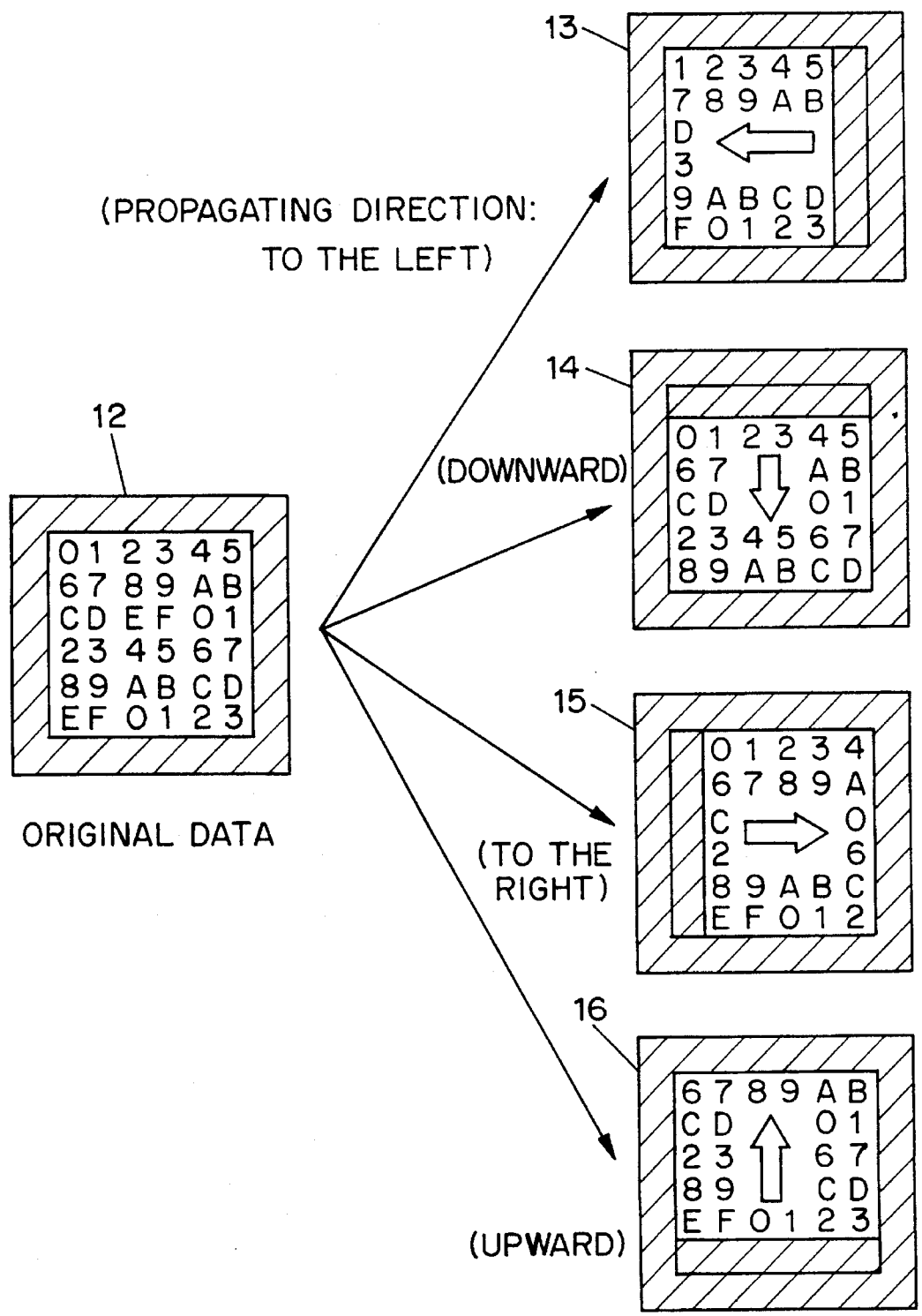
FIG. 21 is a descriptive drawing for the propagation processing performed in a motion-flag memory.

FIG. 21 is a descriptive drawing of the propagation processing performed in the motion-flag memory (9). In the figure, the numeral (12) represents 6×6 pieces of vector values written into the flag memory (9). The surrounding diagonally lined portion shows a portion of one picture element width with an initial data value of zero. The numeral (13) shows a case where the vector values (12) are propagated to the left, the data superimposed on the outer edge on the left side being deleted sequentially. At the right edge, the area with a vector value of zero expands as the data is moved. Similarly the numeral (14) shows a downward propagation, (15) to the right side, and then (16) upward.

Figure 22:
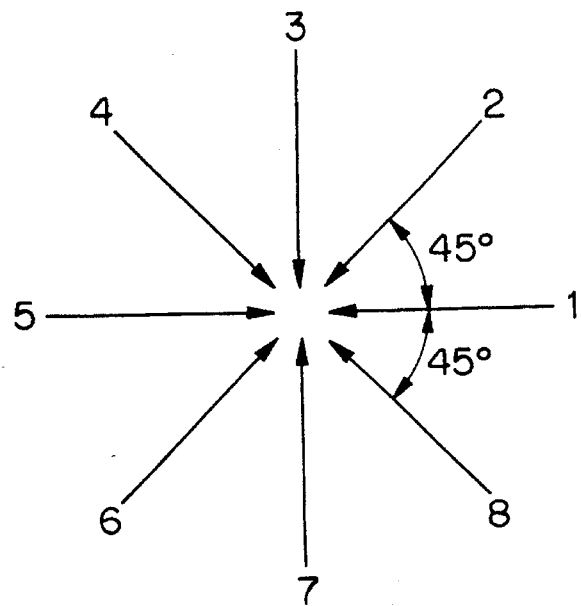
FIG. 22 is a descriptive drawing showing vector directions and propagating directions.
Figure 23:
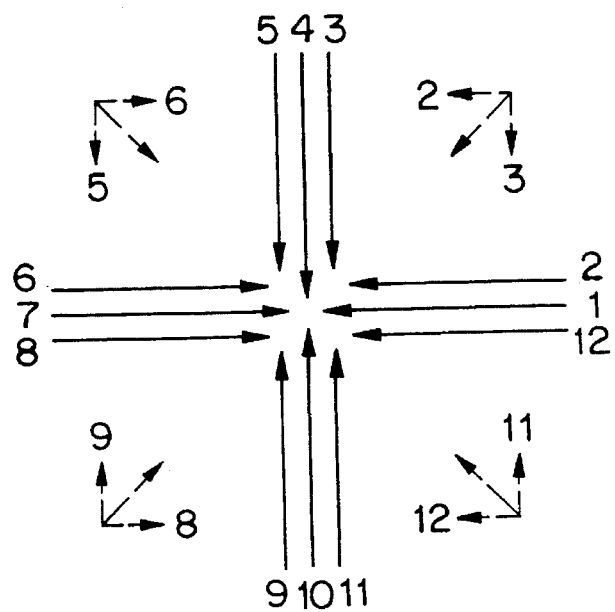
FIG. 23 is a descriptive drawing showing vector directions and propagating directions.

FIGS. 22 and 23 are descriptive drawings showing vector and propagating directions. FIG. 22 shows vectors in eight directions obtained when character patterns are vectorized. The vectors are numbered in a clockwise order. This embodiment cannot directly handle diagonal vectors because of its hardware configuration. Therefore, vertical and horizontal vectors are synthesized to represent diagonal vectors as shown in FIG. 23. That is, diagonal vectors are shown in four directions by combining the vectors numbered 2 and 3, 5 and 6, 8 and 9, and 11 and 12, respectively.

Figure 24:
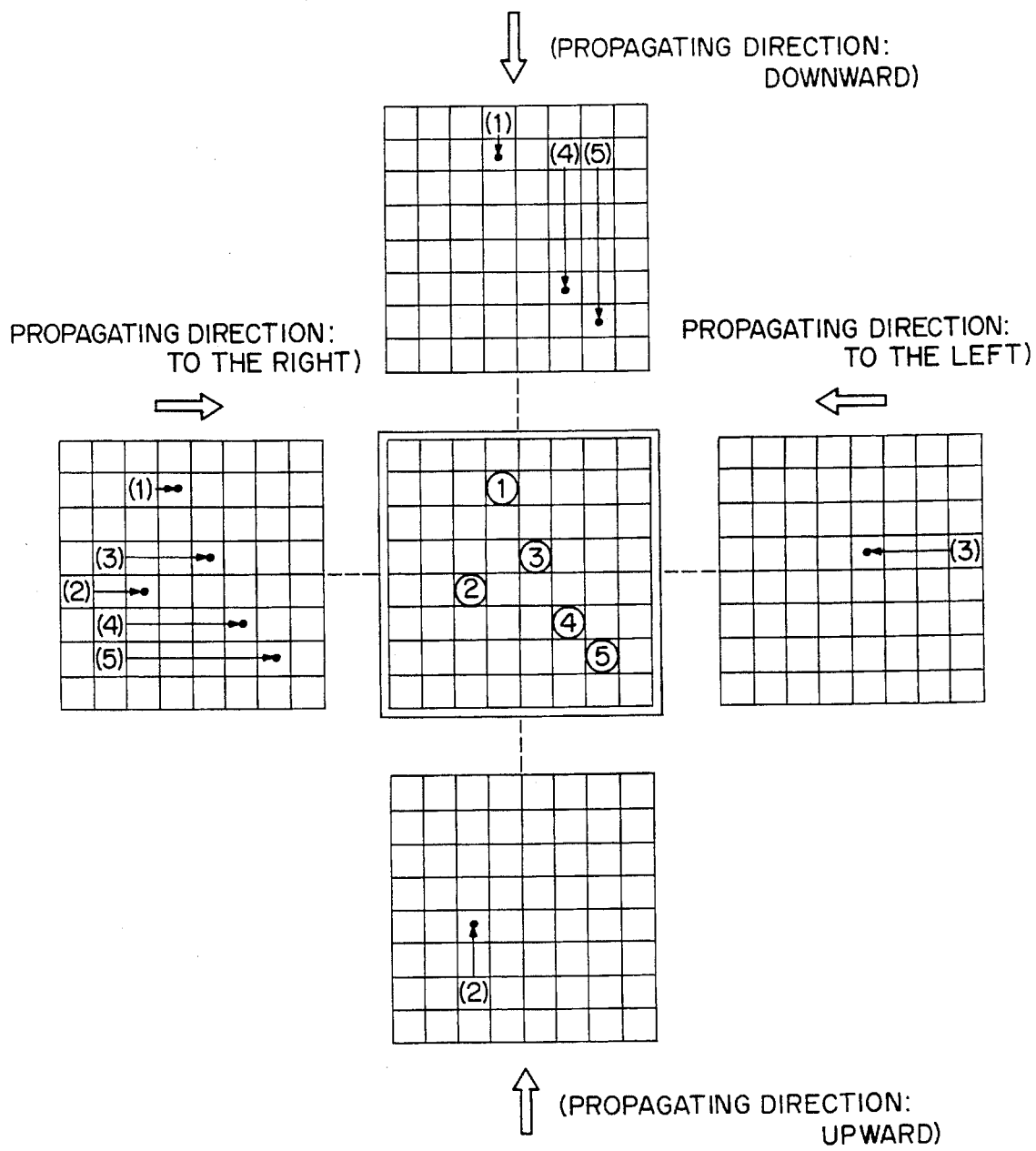
FIG. 24 is a descriptive drawing showing stopping-condition determination processing.

FIG. 24 is a descriptive drawing of stopping-condition determination processing. In the figure, flag data representing the existence of 8×8 vectors are written in propagating directions identical to their respective vector directions, where whether this data coincides with other vectors is checked as this data is given one propagation. If it does coincide, it is assumed that a stopping condition has been established for these particular vector values, and further propagation stops. For example, in the first propagation, the data (1) coincides and stops at position "1". Similarly, in the second propagation, the data (2) coincides and stops at position "2". Furthermore, in the third propagation, the data (3) coincides and stops at position "3". Thereafter, coinciding positions are derived in a similar manner, and upon completing five propagations the stopping result is obtained, as shown in the center. Thus, by means of extracting the coinciding positions obtained during propagation processing and outputting them, three-dimensional, character-pattern features can be obtained. In some cases depending on mode setting, however, it may occur that propagation continues without stopping even after the data coincides.

Figure 25:
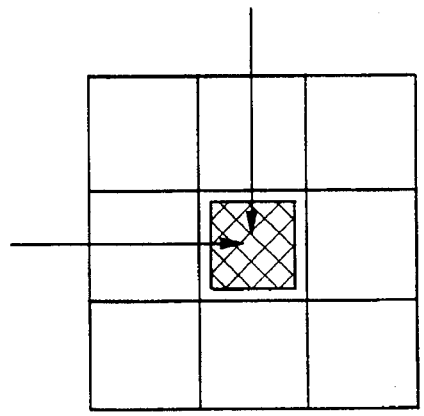
FIG. 25 is a descriptive drawing showing one of the stopping conditions determined per propagation.
Figure 26:
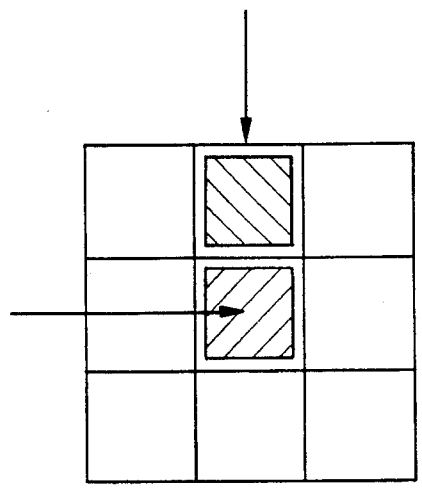
FIG. 26 is a descriptive drawing showing one of the stopping conditions determined per propagation.
Figure 27:
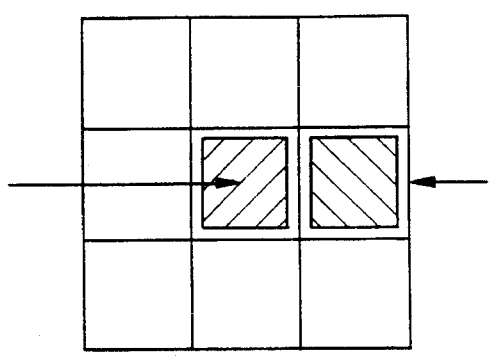
FIG. 27 is a descriptive drawing showing one of the stopping conditions determined per propagation.

FIGS. 25 through 27 are descriptive drawings showing the stopping conditions determined for each propagation in greater detail. While the coincidence of vector values was used as a stopping condition in FIG. 24 described above, this embodiment may also use the adjoining of vector values as a stopping condition.

FIG. 25 shows a case where picture elements facing each other are superimposed on one position and coincided completely, as explained in FIG. 24.

FIG. 26 shows a case where picture elements in two perpendicularly crossing directions adjoin each other, and the loci of the two picture elements are made to cross in the next propagation. This condition may also be used as a stopping condition.

FIG. 27 shows a case where picture elements in two opposite directions adjoin each other, and the picture elements change places in the next propagation. This condition may also be used as a stopping condition. Whether the adjoining shown in FIGS. 26 and 27 is set as a stopping condition will be determined by the mode setting. That is, the stopping condition mode will be set depending on: (1) Angular phase difference in the directional planes of propagation as the object of a stopping condition; (2) Whether adjoining and coinciding conditions are adopted; (3) Whether the object of a stopping condition includes a motion flag or a stopping flag; or (4) Whether the mode is a completion type or permeation type, which deletes the feature quantity with the established stopping condition from a motion flag and moves it to a stopping flag, or a reflection type, which moves it to a 180-degree opposing plane. The specific stopping conditions for a stopping-determination mode are shown in Table A listed below.

TABLE A

| Mode | Description (Stopping Condition) |
| --- | --- |
| Completion | (1) Angular phase difference in the direction of propagation to be processed shall be greater than 90 degrees. |
| | (2) Adjoining conditions are established for both the motion flag and stopping flag. |
| | (3) A feature quantity established for a stopping condition is deleted from the motion flag and moved to the stopping flag. |
| Permeation | (1) Angular phase difference in the direction of propagation to be processed shall be greater than 135 degrees. However, for a diagonal plane, consider it with a direction before it is broken down into horizontal and vertical directions. |
| | (2) The motion flag has an established adjoining condition. The stopping flag is not subjected to condition establishment. |
| | (3) The motion flag is not updated even if a stopping condition is established. |
| Reflection | (1) Angular phase difference in the direction of propagation to be processed shall be greater than 135 degrees. |

TABLE A-continued

| Mode | Description (Stopping Condition) |
| --- | --- |
| | (2) The motion flag is excluded with an adjoining condition. The stopping flag is not subjected to condition establishment. |
| | (3) Once a stopping condition is established, the motion flag moves to a motion flag on a 180-degree opposite plane, and continues additional propagation processing. |

Figure 28:
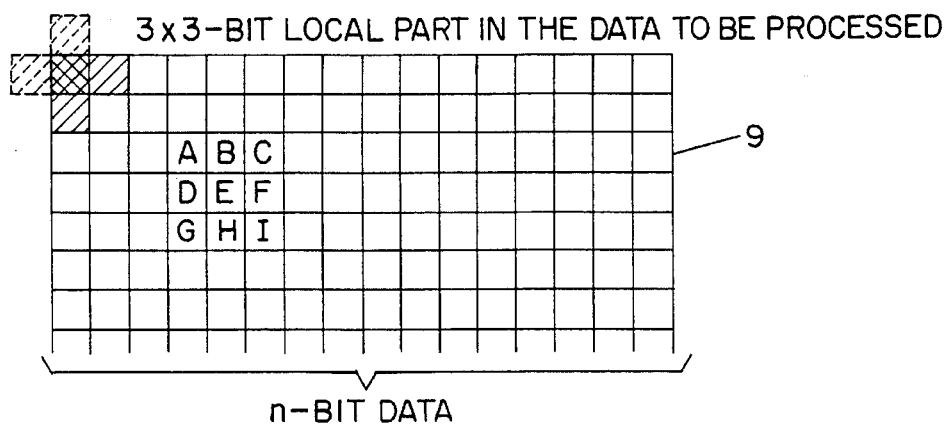
FIG. 28 is a descriptive drawing for extracted objects from local memory determined per propagation.
Figure 29:
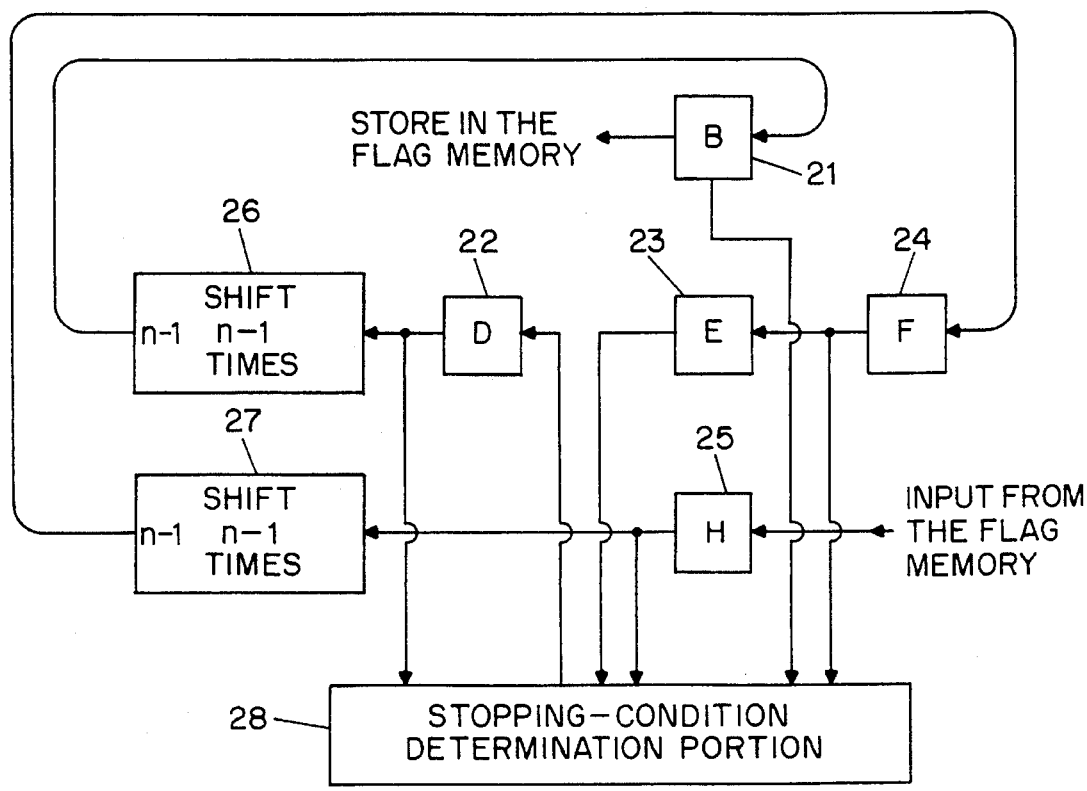
FIG. 29 is a block diagram showing the local memory configuration.

FIG. 28 is a descriptive drawing for objects extracted from the local memory (73), and FIG. 29 is a block diagram showing the configuration of the local memory (73). In FIG. 28, 3×3 bits of data (A) through (I) are extracted centering around a noted address (E) relative to the data in the motion-flag memory (9), which is used as the object. The noted address (E) moves sequentially from the first address to the final address. The local memory (73) in this embodiment has five registers (21) through (25) to accommodate the noted address (E), addresses (B) and (H) above and below thereof, and addresses (D) and (F) to the left and right thereof, and two shift registers (26) and (27), as shown in FIG. 29. Values in these five registers (21) through (25) are compared in a stopping-condition determination portion (28). The arrow marks in the figure show the routes along which data moves, wherein data corresponding to the position (H) is first input into the H register (25) from the motion-flag memory (9). A value input into the H register (25) is input into the stopping-condition determination portion (28) and the shift register (27) in the next processing. The shift register (27) shifts the input value n−1 times, and then inputs the value into the F register (24). The value input into the F register (24) is input into the stopping-condition determination portion (28) and the E register (23) in the next processing. The value input into the E register (23) is input into the stopping-condition determination portion (28) in the next processing, and depending on the determination result at that time, the value is updated, if necessary, and input into the D register (22). Whether the data is also updated will depend on the setting. A value input into the D register (22) is input into the stopping-condition determination portion (28) and the shift register (26) in the next processing. The shift register (26) shifts the input value n−1 times, and then inputs the value into the B register (21). The value input into the B register (21) is accommodated in the stopping-condition determination portion (28) and the corresponding address in the motion-flag memory (9) in the next processing. The data for all of the addresses in the motion-flag memory (9) is input into the registers (21) through (25) sequentially by shifting this data, thereby making it possible to determine the stopping conditions. The stopping conditions are also determined for the stopping-flag memory (10) via a similar operation. To explain, the local memory (73) and the stopping-condition determination portion (28) are disposed with 24 sets, which represent the number of combinations of the motion-flag memory (9) and the stopping-flag memory (10) in each propagating direction. Since the stopping conditions are all determined in parallel for the 24 sets, processing is performed quickly. Next, the operation of the stopping-condition determination portion (28) is explained. The stopping-condition determination portion (28) incorporates AND/OR theory circuit. Noting a unidirectional plane in the motion-flag memory (9) in the permeation-type mode, for example, the theoretical formula for determining stopping conditions is expressed as in Formula (A).

| Formula (A) |
| --- |
| Stopping condition = E register on the 1st plane (noted point)   *   E register on the (5th + 6th + 7th + 8th + 9th planes) + B register on the 5th plane + D register on the (6th + 7th + 8th planes) + H register on the 9th plane |

If 1 is derived from formula (A), a stopping condition is established. In this case, the stopping-flag memory (10) is not used. For other modes, determinations are made using other stopping-condition formulas. With the derived determination results, data with the following contents is output to the local memory (73) for each mode. (1) Completion type: Deletes data from the motion-flag, and sets the stopping flag. (2) Permeation type: Neither updates data in the motion-flag, nor uses the stopping flag. (3) Reflection type: Moves motion-flag data that has collided to a motion plane with a phase that is different by 180°. If the determination results on these stopping conditions accumulate in the same plane, two-dimensional pattern features will result. However, this embodiment incorporates a counter (not shown) to count the number of propagations, and outputs the determination results into different memory regions as the number of propagations increases. Therefore, three-dimensional pattern features can be obtained.

As described above, according to the first implementation of an alternative embodiment of the present invention a motion flag and a stopping flag are used for each vector direction, and the motion-flag is cancelled if both flags coincide with or adjoin each other during propagation processing, and the same amount of data that has been cancelled is newly written into the stopping flag. Because these processes are simultaneous and the vector directions are combined, character features are extracted at a very high velocity, thus improving the performance of an OCR. According to the second implementation, the motion-flag is used for each vector direction, and it is determined whether both flags coincide with or adjoin each other during propagation processing. Because these processes are simultaneous and the vector directions are combined, character features are extracted at a very high velocity, thus improving the performance of an OCR.

According to the third implementation, the motion-flag is used for each vector direction, and it is determined whether both flags coincide with each other during propagation processing. If they do coincide, a flag value is moved to a vector with a phase that is different by 180 degrees. Because these processes are simultaneous and the vector directions are combined, character features are extracted at a very very high velocity, thus improving the performance of an OCR.

While the present invention has been described with respect to preferred embodiments thereof, it is to be understood that the foregoing and other modifications and variations may be made without departing from the scope and spirit thereof.

We claim:

1. A character-feature extraction device characterized in that boundary features of character patterns are broken down into a plurality of vectors and stored in a plurality of memory regions by vector direction wherein each vector is propagated into a respective direction with picture elements and wherein collisions among the vectors are detected via propagation processing, and wherein collision positions in each vector direction are extracted for the number of propagations to provide three-dimensional pattern features, which comprises:

a motion-flag memory having regions each corresponding to the respective pattern for each vector direction;

a stopping-flag memory having regions corresponding to the patterns for each vector direction;

a means for converting the vector extraction positions on the patterns into flags according to their directions, and storing the flags in corresponding regions of the motion-flag memory;

a means for moving flag values in the motion-flag memory via propagation processing into their respective vector directions;

a means for reading the flag values sequentially from a first address to a final address in the motion-flag memory and in the stopping-flag memory after the propagation processing, and determining whether there are flag values representing the existence of vectors in the flag values of said addresses in the flag memory regions with other vectors having a phase difference of more than 90 degrees, and in addresses of the upper, lower, right, and left parts thereof;

a means for resetting the flag values in said addresses in the region of the motion flag memory, and at the same time, setting the flags in said addresses in the regions of the stopping-flag memory with its vectors in the same direction, if there are vector flag values in said addresses of other flag memory regions; and a means for converting the flag values in each stopping-flag memory region and each motion-flag memory region into vector values via determination processing after propagation processing, and outputting the vector values as three-dimensional features.

2. A character-feature extraction device characterized in that boundary features of character patterns are broken down into a plurality of vectors and are stored in a plurality of memory regions by vector direction, wherein each vector is propagated into its respective direction with picture elements and wherein collisions among the vectors are detected via propagation processing and wherein collision positions in each vector direction are extracted for the number of propagations to make them three-dimensional pattern features, which comprises:

a motion-flag memory having regions corresponding to the patterns for each vector direction;

a means for converting the vector extraction positions on the patterns into flags according to their directions, and storing the flags in corresponding regions of the motion-flag memory;

a means for moving flag values in the motion-flag memory via propagation processing into their respective vector directions;

a means for reading the flag values sequentially from a first address to a final address in the motion-flag memory after the propagation processing, and determining whether there are flag values representing the existence of vectors in the flag values of said addresses in the flag memory regions with other vectors having a phase difference of more than 135 degrees, and in addresses of the upper, lower, right, and left parts thereof; and a means for converting the flag values in the motion-flag memory regions, where flag values representing the existence of the vectors have been detected, into vector values via determination processing after propagation processing, and outputting the vector values as three-dimensional features.

3. A character-feature extraction device characterized in that boundary features of character patterns are broken down into a plurality of vectors and are stored in a plurality of memory regions by vector direction, wherein each vector is propagated into a respective direction with picture elements wherein collisions among the vectors are detected via propagation processing and wherein collision positions in each vector direction are extracted for the number of propagations to make them three-dimensional pattern features, which comprises:

- a motion-flag memory having regions corresponding to the patterns for each vector direction;
- a means for converting the vector extraction positions on the patterns into flags according to their directions, and storing the flags in corresponding regions of the motion-flag memory;
- a means for moving flag values in the motion-flag memory via propagation processing into their respective vector directions;
- a means for reading the flag values sequentially from a first address to a final address in the motion-flag memory and the stopping-flag memory after propagation processing, and determining whether there are flag values representing the existence of vectors in the flag values in said addresses of the flag memory regions with other vectors having a phase difference of more than 135 degrees;
- a means or setting flags in said addresses in the regions of the flag memory with vectors that have a phase difference of 180 degrees, if there are vector flag values in said addresses of other flag memory regions; and
- a means or converting the flag values in the motion-flag memory regions, where flag values representing the existence of the vectors have been detected, into vector values via determination processing after propagation processing, and outputting the vector values as three-dimensional features.

* * * * *